US012799326B2

(12) United States Patent
Makiguchi et al.

(10) Patent No.: US 12,799,326 B2
(45) Date of Patent: Nov. 17, 2026

(54) POLYAMIDE RESIN COMPOSITION AND POLYAMIDE MOLDED BODY

(71) Applicant: MITSUI CHEMICALS, INC., Tokyo (JP)

(72) Inventors: Wataru Makiguchi, Ichihara (JP); Haruka Doi, Ichihara (JP); Kohei Nishino, Funabashi (JP); Isao Washio, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 592 days.

(21) Appl. No.: 18/548,245

(22) PCT Filed: Mar. 18, 2022

(86) PCT No.: PCT/JP2022/012582

§ 371 (c)(1),
(2) Date: Aug. 29, 2023

(87) PCT Pub. No.: WO2022/210019

PCT Pub. Date: Oct. 6, 2022

(65) Prior Publication Data

US 2024/0158633 A1 May 16, 2024

(30) Foreign Application Priority Data

Mar. 30, 2021 (JP) ................................ 2021-057551
Mar. 30, 2021 (JP) ................................ 2021-057558

(51) Int. Cl.

*C08G 69/26* (2006.01)
*C08G 69/28* (2006.01)
*C08K 5/02* (2006.01)
*C08K 5/5313* (2006.01)
*C08L 25/18* (2006.01)
*C08L 77/06* (2006.01)
*C08L 77/08* (2006.01)
*C08J 3/20* (2006.01)

(52) U.S. Cl.

CPC ............ *C08L 77/06* (2013.01); *C08G 69/265* (2013.01); *C08K 5/5313* (2013.01); *C08J 3/203* (2013.01); *C08J 2377/06* (2013.01); *C08L 2201/02* (2013.01); *C08L 2203/20* (2013.01); *C08L 2203/30* (2013.01)

(58) Field of Classification Search

CPC .......... C08G 69/26; C08G 69/28; C08K 5/02; C08K 5/5313; C08L 25/18; C08L 77/08
USPC ........................................................ 524/607
See application file for complete search history.

(56) References Cited

U.S. PATENT DOCUMENTS 3,875,120 A 4/1975 Brinkmann et al.
4,036,811 A 7/1977 Noetzel et al.
2016/0177060 A1* 6/2016 Endtner ................ C08K 5/053 524/133
2016/0369052 A1 12/2016 Di Silvestro et al.
2017/0107326 A1 4/2017 Bayer et al.
2018/0112059 A1* 4/2018 Fujii ........................ C08K 5/01
2021/0179778 A1 6/2021 Sekiguchi et al.

FOREIGN PATENT DOCUMENTS

GB 1590056 A 5/1981
JP S4955796 A 5/1974
JP S53125497 A 11/1978
JP S63154739 A 6/1988
JP 2003176408 A 6/2003
JP 2014122329 A 7/2014
JP 2016526597 A 9/2016
JP 2017075303 A 4/2017
WO WO-2004092274 A1 * 10/2004 ............. C08L 77/00
WO 2020040282 A1 2/2020

* cited by examiner

*Primary Examiner* — Deve V Hall
(74) *Attorney, Agent, or Firm* — BUCHANAN INGERSOLL & ROONEY PC

(57) ABSTRACT

Provided is a polyamide resin composition that has high electrical resistance in a high temperature range (around 130° C.) and high heat resistance. The polyamide resin composition includes: a polyamide resin that includes a component unit (a) derived from an aromatic dicarboxylic acid or an alicyclic dicarboxylic acid and a component unit (b2) derived from a diamine represented by formula (1); and at least one flame retardant (X) selected from the group consisting of polybrominated styrenes, brominated polystyrenes, and brominated polyphenylenes, or a flame retardant (Y) containing a specific phosphinate compound, a specific bisphosphinate compound, or a polymer of these compounds. In formula (1), n and the two instances of m are each independently 0 or 1, and —X— is a single bond or a divalent group selected from the group consisting of —O—, —S—, —$SO_2$—, —CO—, and —$CH_2$—.

12 Claims, 1 Drawing Sheet

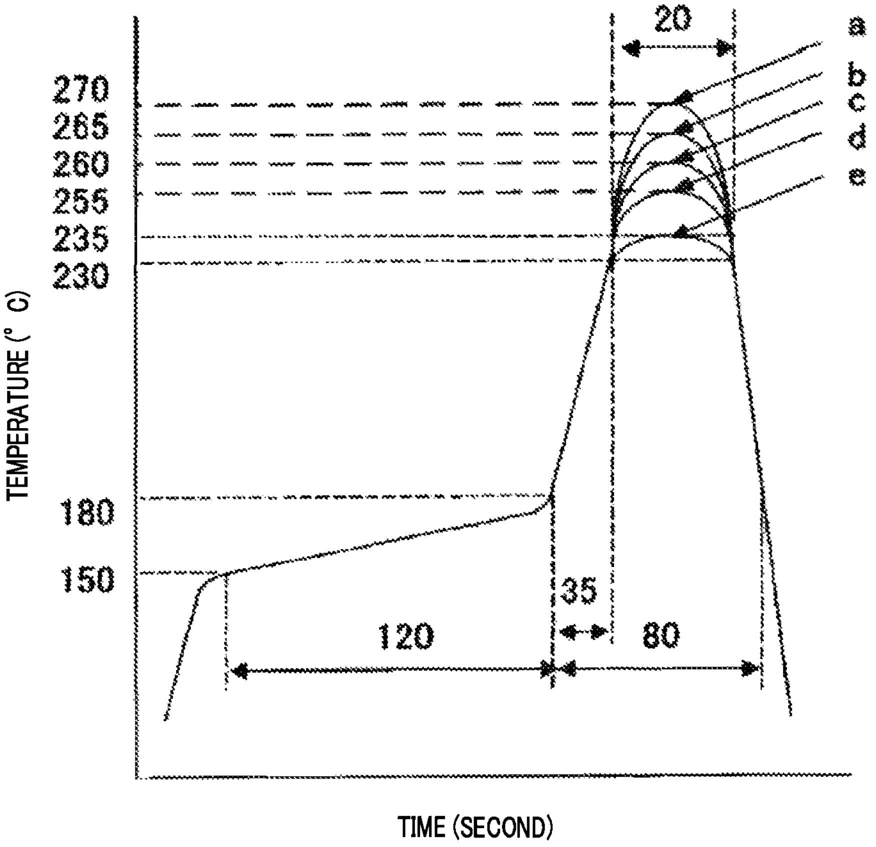
20
a
b
c
d
e
270
265
260
255
235
230
TEMPERATURE (° C)
180
150
35
120
80
TIME (SECOND)

POLYAMIDE RESIN COMPOSITION AND POLYAMIDE MOLDED BODY

TECHNICAL FIELD

The present disclosure relates to a polyamide resin composition and a polyamide molded article.

BACKGROUND ART

In the related art, a polyamide resin composition, which excels in molding processability, mechanical and physical properties, and chemical resistance has been widely used as a material for various parts such as those for clothing, for industrial materials, for automobile, for electrical and electronics, and for industrial purposes.

Various additives are added to a polyamide resin composition in order to provide properties corresponding to respective applications to the polyamide composition.

For example, Patent Literature (hereinafter referred to as "PTL") 1 describes a polyamide composition for sealing electrical and electronics parts, comprising: 100 parts by weight of a semi-aromatic polyamide (A) that comprises a dicarboxylic acid unit (a) containing 50 to 100 mol % of a terephthalic acid unit and a diamine unit (b) containing 50 to 100 mol % of a $C_{6-18}$ aliphatic alkylenediamine unit; 50 to 700 parts by weight of an inorganic filler (B); and 10 to 200 parts by weight of a flame retardant (C). PTL 1 describes that this polyamide resin composition excels in heat resistance and mechanical properties.

In addition, an attempt has been made to change the physical properties of a polyamide resin by changing a raw material of the polyamide resin. For example, PTLs 2 and 3 describe a polyamide resin in which 1,3-bis(aminomethyl) cyclohexane is used as a diamine component used for manufacturing a polyamide by polycondensation of the diamine component and a dicarboxylic acid component. PTL 2 describes that the polyamide resin described therein has a high degree of transparency, and PTL 3 describes that the polyamide resin described therein has a high glass transition point and an improved crystallization capacity.

CITATION LIST

Patent Literature

PTL 1
Japanese Patent Application Laid-Open No. 2003-176408
PTL 2
Japanese Patent Application Laid-Open No. S49-55796
PTL 3
Japanese Patent Application Laid-Open No. 2017-075303

SUMMARY OF INVENTION

Technical Problem

As described in PTL 1, a polyamide resin composition to which a flame retardant is added for enhancing heat resistance is known.

Incidentally, a polyamide resin when used as parts of an electrical device is required to have a higher electrical resistance in order to cope with a tendency of increment in reduction in the size of an electrical device of recent years. Specifically, in order to cope with a high output of an electrical device, the polyamide resin is required to develop a high electrical resistance in a high temperature region (around 130° C.). According to the findings of the present inventors, however, a polyamide resin composition to which a flame retardant is added may have a decreased electrical resistance at the high temperature.

In view of these circumstances, an object of the present disclosure is to provide a polyamide resin composition that makes it possible, while having a high heat resistance, to suppress a decrease in electrical resistance or further enhance electrical resistance in a high temperature region (around 130° C.), and a polyamide molded article containing the polyamide resin composition.

Solution to Problem

[1] A polyamide resin composition containing:

a polyamide resin, the polyamide resin having the content of 20% by mass or more to 80% by mass or less, based on a total mass of the polyamide resin composition, the polyamide resin containing:

a component unit (a) derived from a dicarboxylic acid; and a component unit (b) derived from a diamine, wherein the component unit (a) derived from the dicarboxylic acid includes a component unit derived from an aromatic dicarboxylic acid or an alicyclic dicarboxylic acid, and the component unit (b) derived from the diamine includes:

a component unit (b1) derived from an alkylenediamine having 4 or more and 18 or less carbon atoms, the component unit (b1) having the content of more than 50 mol % and 90 mol % or less, based on a total number of moles of the component unit (b) derived from the diamine; and a component unit (b2) derived from a diamine represented by following formula (1), the component unit (b2) having the content of 10 mol % or more and less than 50 mol %, based on the total number of moles of the component unit (b) derived from the diamine Formula (1)

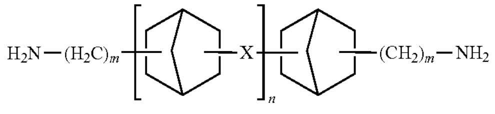

where n and two m's each independently represent 0 or 1, and —X— represents a single bond or a divalent group selected from the group consisting of —O—, —S—, —$SO_2$—, —CO—, and —$CH_2$—; and a flame retardant, wherein the flame retardant is a flame retardant (X) selected from the group consisting of polybrominated styrene, brominated polystyrene, and brominated polyphenylene, the flame retardant (X) having the content of 1% by mass or more and 40% by mass or less, based on the total mass of the polyamide resin composition, or a flame retardant (Y) containing a phosphinate compound represented by formula (I), a bisphosphinate compound represented by formula (II), or a polymer of the phosphinate compound or the bisphosphinate compound, the flame retardant (Y) having the content of 3% by mass or more and 20% by mass or less, based on the total mass of the polyamide resin composition (I)

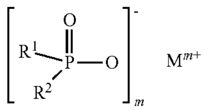

(II)

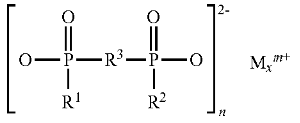

where $R^1$ and $R^2$ independently represent an alkyl group having 1 or more and 6 or less carbon atoms and being linear or having a branched chain or an aryl group, $R^3$ independently represents an alkylene group having 1 or more and 10 or less carbon atoms and being linear or having a branched chain, an arylene group having 6 or more and 10 or less carbon atoms, an alkylarylene group having 6 or more and 10 or less carbon atoms, or an arylalkylene group having 6 or more and 10 or less carbon atoms, M represents an atom or atomic group selected from the group consisting of Mg, Ca, Al, Sb, Sn, Ge, Ti, Zn, Fe, Zr, Ce, Bi, Sr, Mn, Li, Na, K, and a protonated nitrogenous base, m represents an integer of 1 to 4, n represents an integer of 1 to 4, and x represents an integer of 1 to 4.

[2] The polyamide resin composition according to [1], wherein the component unit (b2) derived from the diamine represented by formula (1) has the content of 15 mol % or more and less than 45 mol %, based on the total number of moles of the component unit (b) derived from the diamine.

[3] The polyamide resin composition according to [1] or [2], wherein the component unit (b1) derived from the alkylenediamine having 4 or more and 18 or less carbon atoms includes a component unit derived from a linear alkylenediamine or a branched alkylenediamine.

[4] The polyamide resin composition according to [3], wherein the linear alkylenediamine or the branched alkylenediamine is a diamine selected from the group consisting of 1,4-diaminobutane, 1,6-diaminohexane, 1,9-nonanediamine, 1,10-decanediamine, 2-methyl-1,5-pentanediamine, and 2-methyl-1,8-octanediamine.

[5] The polyamide resin composition according to any one of [1] to [4], wherein the aromatic dicarboxylic acid or the alicyclic dicarboxylic acid is terephthalic acid, naphthalenedicarboxylic acid or cyclohexanedicarboxylic acid.

[6] The polyamide resin composition according to any one of [1] to [5], wherein the flame retardant is the flame retardant (Y) containing the phosphinate compound represented by formula (I), the bisphosphinate compound represented by formula (II), or the polymer of the phosphinate compound or the bisphosphinate compound.

[7] The polyamide resin composition according to any one of [1] to [5], wherein the flame retardant is the flame retardant (X) selected from the group consisting of polybrominated styrene, brominated polystyrene, and brominated polyphenylene.

[8] The polyamide resin composition according to [7] further containing an antimony compound, the antimony compound having the content of 0.01% by mass or more and 5% by mass or less based on the total mass of the polyamide resin composition.

[9] The polyamide resin composition according to [8] further containing a salt of zinc or a salt of calcium, the salt(s) having the content of 0.5% by mass or more and 10% by mass or less based on the total mass of the polyamide resin composition.

[10] The polyamide resin composition according to any one of [1] to [9], wherein the polyamide resin composition is a resin composition for an insulation material.

[11] A polyamide molded article containing the polyamide resin composition according to any one of [1] to [10].

[12] The polyamide molded article according to [11], wherein the polyamide molded article is parts of an electrical device.

Advantageous Effects of Invention

According to the present disclosure, it is possible to provide a polyamide resin composition capable of, while having a high heat resistance, developing a high electrical resistance in a high temperature region (around 130° C.), and a polyamide molded article containing the polyamide resin composition.

BRIEF DESCRIPTION OF DRAWINGS

The FIGURE illustrates a relationship between temperature and time in a reflow step of reflow heat resistance tests conducted in examples and comparative examples in the present application.

DESCRIPTION OF EMBODIMENTS

In the present disclosure, a numerical range expressed using "to" means a range including numerical values described before and after the "to" as a minimum value and a maximum value, respectively.

In numerical ranges described in a stepwise manner in the present disclosure, an upper limit value or a lower limit value described in a certain numerical range may be replaced with an upper limit value or a lower limit value of another numerical range described in a stepwise manner. Further, in numerical ranges described in the present disclosure, an upper limit value or a lower limit value described in a certain numerical range may be replaced with values indicated in the examples.

1. Embodiment 1

Embodiment 1 of the present disclosure relates to a polyamide resin composition.

The polyamide resin composition is a resin composition in which a main component of a resin component is a polyamide resin. What is meant by the main component is that the proportion of the polyamide resin in the resin component is 50% by mass or more. The proportion of the polyamide resin in the resin component is preferably 60% by mass or more, more preferably 70% by mass or more, still more preferably 80% by mass or more, and particularly preferably 90% by mass or more. The upper limit of the proportion of the polyamide resin in the resin component is not particularly limited, but can be 100% by mass or less, and may be 90% by mass or less or may be 80% by mass or less.

The proportion of the polyamide resin contained in the polyamide resin composition is preferably 20% by mass or more to 80% by mass or less based on the total mass of the polyamide resin composition.

1-1. Polyamide Resin

The polyamide resin may be a polyamide resin containing a component unit (a) derived from a dicarboxylic acid and a component unit (b) derived from a diamine. At this time, in order to set the melting point (Tm) and the glass transition temperature (Tg) of the polyamide resin within the range described above, the component unit (a) derived from a dicarboxylic acid preferably includes a component unit derived from an aromatic dicarboxylic acid or an alicyclic dicarboxylic acid, and the component unit (b) derived from a diamine preferably includes more than 50 mol % and 90 mol % or less, based on a total number of moles of the component unit (b) derived from a diamine, of a component unit (b1) derived from an alkylenediamine having 4 or more and 18 or less carbon atoms, and 10 mol % or more and less than 50 mol %, based on the total number of moles of the component unit (b) derived from a diamine, of a component unit (b2) derived from a diamine represented by formula (1).

[Component Unit (a) Derived From Dicarboxylic Acid]

The melting point (Tm) and the crystalline property of the polyamide resin can be sufficiently enhanced when the polyamide resin contains the component unit derived from an aromatic dicarboxylic acid or an alicyclic dicarboxylic acid as the component unit (a) derived from a dicarboxylic acid.

Examples of the aromatic dicarboxylic acid include terephthalic acid, naphthalenedicarboxylic acid, and esters thereof. Examples of the alicyclic dicarboxylic acid include cyclohexanedicarboxylic acid and esters thereof. Among the above, from the viewpoint of obtaining a polyamide resin having a high crystalline property and a high heat resistance, or the like, the component unit (a) derived from a dicarboxylic acid preferably includes a component unit derived from an aromatic dicarboxylic acid, and more preferably includes a component unit derived from terephthalic acid.

The content of the component unit derived from an aromatic dicarboxylic acid or an alicyclic dicarboxylic acid (preferably the component unit derived from an aromatic dicarboxylic acid, and more preferably the component unit derived from terephthalic acid) is not particularly limited, but is preferably 50 mol % or more and 100 mol % or less based on the total number of moles of the component unit (a) derived from a dicarboxylic acid. When the content of the foregoing component unit is 50 mol % or more, the crystalline property of the polyamide resin is likely to be enhanced. From the same viewpoint, the content of the foregoing component unit is more preferably 70 mol % or more and 100 mol % or less.

In the present embodiment, the component unit (a) derived from a dicarboxylic acid preferably includes a component unit (a1) derived from terephthalic acid, naphthalenedicarboxylic acid or cyclohexanedicarboxylic acid. These component units (a1), unlike isophthalic acid, for example, can enhance the crystalline property of the polyamide. From the viewpoint of ensuring the crystalline property of the polyamide resin, the content of these component units (a1) is more than 20 mol % and 100 mol % or less based on the total number of moles of the component unit (a) derived from a dicarboxylic acid.

From the viewpoint of further enhancing the crystalline property of the polyamide resin, the content of these component units (a1) is preferably 45 mol % or more and 100 mol % or less, more preferably 50 mol % or more and 99 mol % or less, still more preferably 80 mol % or more and 99 mol % or less, and particularly preferably 90 mol % or more and 99 mol % or less, based on the total number of moles of the component unit (a) derived from a dicarboxylic acid.

The component unit (a) derived from a dicarboxylic acid may include an aromatic carboxylic acid component unit (a2) other than the component unit (a1) or an aliphatic dicarboxylic acid component unit (a3) having 4 or more and 20 or less carbon atoms as long as the effect disclosed herein is not impaired. From the viewpoint of not impairing the crystalline property of the resin, however, the content of a component unit derived from isophthalic acid or of a component unit derived from an aliphatic dicarboxylic acid having 4 or more and 18 or less carbon atoms other than adipic acid is preferably small. Specifically, the content thereof is preferably 20 mol % or less, and more preferably 10 mol % or less, based on the total number of moles of the component unit (a) derived from a dicarboxylic acid.

Examples of the aromatic dicarboxylic acid component unit (a2) other than terephthalic acid include a component unit derived from isophthalic acid and a component unit derived from 2-methylterephthalic acid. Among these, the component unit derived from isophthalic acid is preferred. From the viewpoint of ensuring the crystalline property of the polyamide resin, the content of these component units (a2) is preferably 1 mol % or more and 50 mol % or less, more preferably 1 mol % or more and 20 mol % or less, still more preferably 1 mol % or more and 10 mol % or less, and particularly preferably 1 mol % or more and 5 mol % or less, based on the total number of moles of the component unit (a) derived from a dicarboxylic acid.

The component unit (a3) derived from an aliphatic dicarboxylic acid is a component unit derived from an aliphatic dicarboxylic acid having an arkylene group having 4 or more and 20 or less carbon atoms, and is preferably a component unit derived from an aliphatic dicarboxylic acid having an arkylene group having 6 or more and 12 or less carbon atoms. Examples of the aliphatic dicarboxylic acid include succinic acid, glutaric acid, adipic acid, 2-methyladipic acid, trimethyladipic acid, pimelic acid, 2,2-dimethylglutaric acid, 3,3-diethyl succinic acid, azelaic acid, sebacic acid, and suberic acid component units. Among these, adipic acid and sebacic acid are preferred. From the viewpoint of ensuring the crystalline property of the polyamide resin, the content of these component units (a3) is preferably 0 mol % or more and 40 mol % or less, more preferably 0 mol % or more and 20 mol % or less, still more preferably 1 mol % or more and 10 mol % or less, and particularly preferably 1 mol % or more and 5 mol % or less, based on the total number of the component unit (a) derived from a dicarboxylic acid.

The semi-aromatic polyamide resin (A) may further contain, in addition to the component units (a1), (a2), and (a3), a small amount of a tribasic or higher polyvalent carboxylic acid component unit such as trimellitic acid or pyromellitic acid. The content of such a polyvalent carboxylic acid component unit can be 0 mol % or more and 5 mol % or less based on the total number of moles of the component unit (a) derived from a dicarboxylic acid.

[Component Unit (b) Derived From Diamine]

The glass transition temperature (Tg) of a polyamide resin that contains, as the component unit (b) derived from a diamine, the component unit (b2) derived from an alkylenediamine having a specific cyclic structure (a diamine represented by formula (1)) in addition to the component unit (b1) derived from an alkylenediamine having 4 or more and 18 or less carbon atoms, can be sufficiently increased.

That is, the component unit (b2) derived from a diamine represented by formula (1) has a non-linear structure and therefore reduces the motion property of a molecular chain of a polyamide resin. Accordingly, the component unit (b2) derived from a diamine represented by formula (1) may cause the glass transition temperature (Tg) of a polyamide resin containing the above component unit (b2) to be higher than that of a polyamide resin free of the above component unit (b2). Thus, it is also considered that a polyamide resin containing the above component unit (b2) has a high mechanical strength even in a high temperature region, and can maintain this high mechanical strength for a long period of time.

Further, the component unit (b2) derived from a diamine represented by formula (1) may cause the melting point (Tm) of a polyamide resin containing the above component unit (b2) to be moderately reduced than that of a polyamide resin free of the above component unit (b2). Thus, a polyamide resin containing the above component unit (b2) has a high flowability at the time of injection molding and also has a high molding process ability.

According to the findings of the present inventors, a wholly aromatic polymer such as polyethersulfone (PES), polyphenylene sulfide (PPS), and polyether ether ketone (PEEK) is likely to suffer a short circuit (tracking) due to carbonization of an aromatic ring and tends to have a low electrical resistance. Further, when resin compositions containing these resins further contain a flame retardant, carbonization of an aromatic ring, due to motion of the molecules of the resins at interfaces between the flame retardant and the resins to lead to interaction between the molecules of the resins and the flame retardant, is likely to occur at the time of heating, which leads to a decrease in electrical resistance due to tracking. A polyamide resin also has the same tendency as this decrease in the electrical resistance in a high temperature region due to the addition of a flame retardant occurs. However, a semi-aromatic polyamide, which has a smaller number of aromatic rings, and an aliphatic polyamide, on the other hand, are unlikely to suffer tracking and have a high electrical resistance. In the semi-aromatic polyamide or an aliphatic polyamide, which has a high electrical resistance, the motion property of molecules in a high temperature region is further reduced with the component unit (b2) derived from a diamine represented by formula (1). Then, even when some aromatic rings in a high temperature region are carbonized, because the motion property of molecules is reduced, the carbonized aromatic rings to unlikely to be adjacent to each other. It is considered that the above ensures a high electrical resistance of a polyamide resin in a high temperature region.

Further, according to novel findings of the present inventors, the component unit (b2) derived from a diamine represented by formula (1) contained in the semi-aromatic polyamide or aliphatic polyamide also makes it possible to suppress a decrease in the tensile strength of the polyamide resin composition in a high temperature region which is occurred when a flame retardant is added.

In addition, the polyamide resin has crystalline property due to the component unit (b1) derived from an alkylenediamine having 4 or more and 18 or less carbon atoms, and therefore has a high flowability at the time of injection molding and a high mechanical strength. Further, it is considered that the polyamide resin has a high glass transition temperature (Tg) and therefore has a high mechanical strength and a high electrical resistance even in a high temperature region, and is likely to hold these high mechanical strength and high electrical resistance.

The number of carbon atoms of the alkylenediamine having 4 or more and 18 or less carbon atoms serving as a raw material of the component unit (b1) is more preferably 4 or more and 10 or less carbon atoms from the viewpoint of causing the Tg of a resin to unlikely to decrease.

The alkylenediamine having 4 or more and 18 or less carbon atoms may include a linear alkylenediamine or a branched alkylenediamine. From the viewpoint of enhancing the crystalline property of the resin, the alkylenediamine having 4 or more and 18 or less carbon atoms preferably includes a linear alkylenediamine. That is, the component unit derived from an alkylenediamine having 4 or more and 18 or less carbon atoms preferably includes a component unit derived from a linear alkylenediamine.

Examples of the alkylenediamine having 4 or more and 18 or less carbon atoms include: linear alkylenediamines including 1,4-diaminobutane, 1,6-diaminohexane, 1,7-diaminoheptane, 1,8-octanediamine, 1,9-nonanediamine, and 1,10-decanediamine, and the like; and branched alkylenediamines including 2-methyl-1,5-pentanediamine, and 2-methyl-1,8-octanediamine, and the like. Among these, 1,4-diaminobutane, 1,6-diaminohexane, 1,9-nonanediamine, 1,10-decanediamine, 2-methyl-1,5-pentanediamine, and 2-methyl-1,8-octanediamine are preferred, and 1,6-diaminohexane and 1,10-decanediamine are preferred. One of these alkylenediamines may be used, or two or more thereof may be used.

Regarding Component Unit (b2) Derived From Alkylenediamine Having Specific Cyclic Structure:

The alkylenediamine having a specific cyclic structure is a diamine represented by following formula 1

Formula (1)

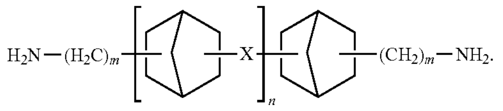

In Formula (1), n and two m's each independently represent 0 or 1, and —X— represents a single bond or a divalent group selected from the group consisting of —O—, —S—, —$SO_2$—, —CO—, and —$CH_2$—.

The diamine represented by formula (1) is preferably norbornanediamine (m=n=0) or bis(aminomethyl)norbornane (m=1 and n=0), more preferably bis(aminomethyl) norbornane, and still more preferably 2,5-bis(aminomethyl) norbornane or 2,6-bis(aminomethyl)norbornane. Two or more diamines represented by formula (1) may contained. For example, both 2,5-bis(aminomethyl)norbornane and 2,6-bis(aminomethyl) norbornane may be contained.

In particular, when one or both of two m's are 1, the mechanical strength of the polyamide resin is likely to be enhanced and the high mechanical strength thereof is likely to be held.

Note that, when the diamine represented by formula (1) has geometric isomers (such as a trans isomer and a cis isomer), the type and ratio of the isomers are not particularly limited.

The content of the component unit (b1) derived from an alkylenediamine having 4 or more and 18 or less carbon atoms is preferably more than 50 mol % and 90 mol % or less based on the total number of moles of the component unit (b) derived from a diamine. When the above content is more than 50 mol %, the crystalline property of the polyamide resin can be sufficiently enhanced to further enhance the flowability of the resin at the time of injection molding and the mechanical strength thereof. When the above content is 90 mol % or less, the content of the component unit (b2) derived from a diamine represented by formula (1) can be increased. Thus, it is possible to enhance the mechanical strength and the electrical resistance of the polyamide resin in a high temperature region by increasing the glass transition temperature (Tg) of the polyamide resin, and to enhance the molding processability of the polyamide resin appropriately reducing the (Tm) of the polyamide resin.

The content of the component unit (b2) derived from a diamine represented by formula (1) is, on the other hand, preferably 10 mol % or more and less than 50 mol % based on the total number of moles of the component unit (b) derived from a diamine. When the above content is 10 mol % or more, it is possible to enhance, enhancing the mechanical strength and the electrical resistance of the polyamide resin in a high temperature region by increasing the glass transition temperature (Tg) of the polyamide resin, and to enhance the molding processability of the polyamide resin by appropriately reducing the (Tm) of the polyamide resin. When the above content is less than 50 mol %, the content of the component unit (b1) derived from an alkylenediamine having 4 or more and 18 or less carbon atoms can be increased. Thus, it is possible to sufficiently enhance the crystalline property of the polyamide resin and to further enhance the flowability of the resin at the time of injection molding and the mechanical strength thereof From the viewpoint described above, the content of the component unit (b1) derived from an alkylenediamine having 4 or more and 18 or less carbon atoms is preferably more than 50 mol % and 90 mol % or less, more preferably 55 mol % or more and 85 mol % or less, and still more preferably 60 mol % or more and 80 mol % or less, based on the total number of moles of the component unit (b) derived from a diamine.

In addition, from the viewpoint described above, the content of the component unit (b2) derived from a diamine represented by formula (1) is preferably 10 mol % or more and less than 50 mol %, more preferably 15 mol % or more and less than 45 mol %, still more preferably 20 mol % or more and 40 mol % or less, and particularly preferably 25 mol % or more and 40 mol % or less, based on the total number of moles of the component unit (b) derived from a diamine.

The component unit (b) derived from a diamine may further include a component unit (b3) derived from another diamine as long as the effect disclosed herein is not impaired. Examples of another diamine include an aromatic diamine and an alicyclic diamine. The content of the component unit (b3) derived from another diamine may be 50 mol % or less based on the total number of moles of the component unit (b) derived from a diamine.

From the viewpoint of enhancing the thermal stability of a compound or at the time of molding and further enhancing the mechanical strength, terminal groups of at least some molecules of a polyamide resin may be blocked with a terminal blocking agent. For example, in a case where a terminal of a molecule is a carboxyl group, the terminal blocking agent is preferably a monoamine, and in a case where a terminal of a molecule is an amino group, the terminal blocking agent is preferably a monocarboxylic acid.

Examples of the monoamine include: aliphatic monoamines including methylamine, ethylamine, propylamine, butylamine, and the like; alicyclic monoamines including cyclohexylamine, dicyclohexylamine, and the like; and aromatic monoamines including aniline, toluidine, and the like. Examples of the monocarboxylic acid include: aliphatic monocarboxylic acids having 2 or more and 30 or less carbon atoms, including acetic acid, propionic acid, butyric acid, valeric acid, caproic acid, caprylic acid, lauric acid, tridecylic acid, myristic acid, palmitic acid, stearic acid, oleic acid, linoleic acid, and the like; aromatic monocarboxylic acids including benzoic acid, toluic acid, naphthalenecarboxylic acid, methylnaphthalenecarboxylic acid, phenylacetic acid, and the like; and alicyclic monocarboxylic acids including cyclohexanecarboxylic acid and the like. The aromatic monocarboxylic acid and the alicyclic monocarboxylic acid may have a substituent at the cyclic structure moiety.

[Physical Properties]

For the polyamide resin described above, the melting point (Tm) measured using a differential scanning calorimeter (DSC) can be 280° C. or more and 335° C. or less, and the glass transition temperature (Tg) measured using the DSC is preferably 135° C. or more and 180° C. or less. Note that, the above melting point (Tm) and the above glass transition temperature (Tg) can be a melting point (Tm) and a glass transition temperature (Tg) that are measured with a temperature rising rate of 10° C./min.

When the melting point (Tm) of the polyamide resin described above is 280° C. or more, the mechanical strength and the heat resistance of the polyamide resin composition or a molded article in a high temperature region are unlikely to be impaired. In addition, when the melting point (Tm) of the polyamide resin described above is 335° C. or less, it is not necessary to excessively increase the molding temperature, and thus, the molding processability of the polyamide resin composition is likely to be favorable. Further, when it is not necessary to excessively increase the molding temperature, a flame retardant is unlikely to decompose at the time of molding, and thus, the addition amount of a flame retardant can be appropriately suppressed and a decrease in the mechanical strength due to the addition of a flame retardant can be suppressed. From the viewpoint described above, the melting point (Tm) of the polyamide resin is more preferably 290° C. or more and 330° C. or less, and still more preferably 300° C. or more and 325° C. or less.

When the glass transition temperature (Tg) of the polyamide resin described above is 135° C. or more, the heat resistance of the polyamide resin composition or a molded article is unlikely to be impaired, and at the same time the mechanical strength and the electrical resistance in a high temperature region can be further enhanced, and moreover a decrease in the tensile strength in a high temperature region due to the addition of a flame retardant which is a phosphinate compound or a bisphosphinate compound can be suppressed more sufficiently. When the glass transition temperature (Tg) of the polyamide resin described above is 180° C. or less, the molding processability of the polyamide resin composition is likely to be favorable. From the viewpoint described above, the glass transition temperature (Tg) of the polyamide resin described above is more preferably 140° C. or more and 170° C. or less.

The enthalpy of fusion (ΔH) of the crystalline polyamide resin is preferably 10 mJ/mg or more. A crystalline polyamide resin having an enthalpy of fusion (ΔH) of 10 mJ/mg or more has crystalline property, and thus, the flowability at the time of injection molding and the mechanical strength are likely to be enhanced. From the same viewpoint, the enthalpy of fusion (ΔH) of the crystalline polyamide resin is more preferably 15 mJ/mg or more, and still more preferably 20 mJ/mg or more. Note that, the upper limit of the enthalpy of fusion (ΔH) of the crystalline polyamide resin is not particularly limited, but may be 90 mJ/mg from the viewpoint of not impairing the molding processability.

Note that, the enthalpy of fusion (ΔH), the melting point (Tm), and the glass transition temperature (Tg) of the polyamide resin can be measured using a differential scanning calorimeter (DSC220C type, manufactured by Seiko Instruments Inc.).

Specifically, approximately 5 mg of a polyamide resin are hermetically sealed in an aluminum pan for measurement and heating to 350° C. at 10° C./min from room temperature is performed. To allow the resin to melt completely, the resin is held at 360° C. for 3 minutes, and then cooled to 30° C. at 10° C./min. After allowed to stand at 30° C. for 5 minutes, second heating is performed to 360° C. at 10° C./min. The temperature (° C.) of an endothermic peak in the second heating is defined as the melting point (Tm) of the crystalline polyamide resin, and the displacement point corresponding to the glass transition is defined as the glass transition temperature (Tg) thereof. The enthalpy of fusion (ΔH) is determined from the area of an exothermic peak of crystallization in the first temperature rising process in accordance with JIS K 7122.

The melting point (Tm), the glass transition temperature (Tg), and the enthalpy of fusion (ΔH) of the crystalline polyamide resin can be adjusted by the structure of the component unit (a) derived from a dicarboxylic acid, the content of the component unit (b2) derived from a diamine represented by formula (1), the content ratio of the component unit (b1) derived from an alkylenediamine having 4 or more and 18 or less carbon atoms to the component unit (b2) derived from a diamine represented by formula (1), and the number of carbon atoms of the alkylenediamine having 4 or more and 18 or less carbon atoms.

In addition, in a case where the enthalpy of fusion (ΔH) of the crystalline polyamide resin is increased, the content of the component unit (b2) and the content ratio thereof (the ratio of the component unit (b2) to the total number of moles of the component unit (b) derived from a diamine) are preferably reduced. In a case where the glass transition temperature (Tg) of the crystalline polyamide resin is increased and the melting point (Tm) thereof is reduced, on the other hand, the content of the component unit (b2) and the content ratio thereof (the ratio of the component unit (b2) to the total number of moles of the component unit (b) derived from a diamine), for example, is preferably increased.

The intrinsic viscosity [η] of the crystalline polyamide resin, which is measured in 96.5% sulfuric acid at a temperature of 25° C., is preferably 0.6 dl/g or more and 1.5 dl/g or less. When the intrinsic viscosity [η] of the crystalline polyamide resin is 0.6 dl/g or more, the mechanical strength (such as toughness) of a molded article is likely to be sufficiently enhanced, and when the intrinsic viscosity [η] of the crystalline polyamide resin is 1.5 dl/g or less, the flowability of the resin composition at the time of molding is unlikely to be impaired. From the same viewpoint, the intrinsic viscosity [η] of the crystalline polyamide resin is more preferably 0.8 dl/g or more and 1.2 dl/g or less. The intrinsic viscosity [η] can be adjusted with a terminal blocking amount of the crystalline polyamide resin or the like.

The intrinsic viscosity of the crystalline polyamide resin can be measured in accordance with JIS K6810-1977.

Specifically, 0.5 g of the crystalline polyamide resin are dissolved in 50 ml of a 96.5% sulfuric acid solution to prepare a sample solution. The intrinsic viscosity can be calculated by measuring the flow-down time (sec) of the sample solution under a condition of 25±0.05° C. using an Ubbelohde viscometer, and fitting the resulting value to the following equation:

$$[\eta]=\eta SP/[C(1+0.205\eta SP)].$$

In the equation described above, the algebras or variables represent:

[η]: intrinsic viscosity (dl/g),

ηSP: specific viscosity, and

C: sample concentration (g/dl).

ηSP is determined by the following equation:

$$\eta SP=(t-t0)/t0$$

where t: flow-down time (sec) of sample solution, and t0: flow-down time (sec) of blank sulfuric acid.

[Manufacturing Method]

The polyamide resin can be manufactured by, for example, polycondensation of the dicarboxylic acid described above and the diamine described above in a homogeneous solution. Specifically, the polyamide resin can be manufactured by heating a dicarboxylic acid and a diamine in the presence of a catalyst as described in WO 03/085029 to obtain a low-order condensate, and then imparting a shear stress to a melt of the low-order condensate and subjecting the melt to polycondensation.

From the viewpoint of adjusting the intrinsic viscosity of the polyamide resin or the like, the terminal blocking agent described above may be added to a reaction system. The intrinsic viscosity [η] (or molecular weight) of the polyamide resin can be adjusted with the addition amount of the terminal blocking agent. The terminal blocking agent is added to a reaction system of a dicarboxylic acid and a diamine. The addition amount thereof is preferably 0.07 mol or less, and more preferably 0.05 mol or less, based on 1 mol of the total amount of the dicarboxylic acid.

1-2. Flame Retardant

The polyamide resin composition described above preferably contains one of flame retardants described below. Note that, the polyamide resin composition described above may contain both a flame retardant (X) and a flame retardant (Y):

(X) polybrominated styrene, brominated polystyrene, or brominated polyphenylene; and (Y) a phosphinate compound represented by formula (I) or a bisphosphinate compound represented by formula (II), or a polymer of the phosphinate compound or the bisphosphinate compound.

(I)

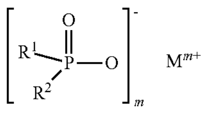

(II)

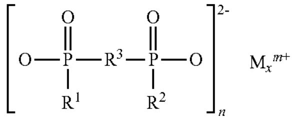

In formulae (I) and (II), $R^1$ and $R^2$ independently represent an alkyl group having 1 or more and 6 or less carbon atoms and being linear or having a branched chain or an aryl group, $R^3$ independently represents an alkylene group having 1 or more and 10 or less carbon atoms and being linear or having a branched chain, an arylene group having 6 or more and 10 or less carbon atoms, an alkylarylene group having 6 or more and 10 or less carbon atoms, or an arylalkylene group having 6 or more and 10 or less carbon atoms, M represents an atom or atomic group selected from the group consisting of Mg, Ca, Al, Sb, Sn, Ge, Ti, Zn, Fe, Zr, Ce, Bi, Sr, Mn, Li, Na, K, and a protonated nitrogenous base, m represents an integer of 1 to 4, n represents an integer of 1 to 4, and x represents an integer of 1 to 4.

These flame retardants are not stronger in basicity than other flame retardants such as magnesium oxide and aluminum hydroxide, and therefore suppress decomposition of a polyamide resin and facilitate maintaining the mechanical strength of a molded article.

1-2-1. Flame Retardant (X)

The flame retardant (X) is polybrominated styrene, brominated polystyrene or brominated polyphenylene.

The polybrominated styrene is a polymer containing a component unit derived from brominated styrene or brominated a-methylstyrene. Examples of the brominated styrene described above include dibromostyrene, tribromostyrene, and pentabromostyrene. Examples of the brominated α-methylstyrene described above include tribromo-α-methylstyrene. Note that, the polybrominated styrene may be a copolymer of brominated styrene or brominated α-methylstyrene and a (meth)acrylic ester compound having an epoxy group. Further, the polybrominated styrene may be the various polymers described above to which an unsaturated carboxylic acid or a derivative thereof is graft-copolymerized.

In these polybrominated styrenes, bromine atoms substitute hydrogen atoms bonded to carbon atoms forming an aromatic ring and are present in the (co)polymer. Then, usually, hydrogen atoms forming an alkyl chain that forms the main skeleton of the (co)polymer are substantially not substituted with bromine atoms.

Note that, substantially not substituted with bromine atoms means that the proportion of hydrogen atoms substituted with bromine atoms among the hydrogen atoms bonded to the carbon atoms forming the alkyl chain that forms the main skeleton of the (co)polymer is 0.0% by mass or more and 0.5% by mass or less. In the polybrominated styrene, the proportion of hydrogen atoms substituted with bromine atoms described above is preferably 0.0% by mass or more and 0.2% by mass or less.

The brominated polystyrene is a (co)polymer obtained by brominating polystyrene or poly-α-methylstyrene. The brominated polystyrene contains bromine atoms that have substituted hydrogen atoms bonded to carbon atoms forming an aromatic ring in the same manner as the polybrominated styrene, but partially contains bromine atoms that have substituted hydrogen atoms forming an alkyl chain that forms the main skeleton of the (co)polymer. Specifically, in the brominated polystyrene, the proportion of hydrogen atoms substituted with bromine atoms among the hydrogen atoms bonded to the carbon atoms forming the alkyl chain that forms the main skeleton of the (co)polymer is more than 0.5% by mass. The brominated polyphenylene is a (co) polymer obtained by brominating a polyphenylene ether resin. The brominated polyphenylene is preferably a compound represented by following general formula (1).

General Formula (1)

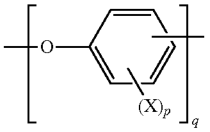

In general formula (1), X represents Br, p represents a number of 1 to 4, and q represents a number of 1 or more. Preferably, q is 2 or more, and more preferably 5 or more. The upper limit of q is not particularly limited, but is preferably 100 or less, more preferably 80 or less, still more preferably 60 or less, further more preferably 40 or less, further still more preferably 20 or less, and particularly preferably 10 or less.

Examples of the brominated polyphenylene represented by general formula (1) include polydibromo-p-phenylene oxide, polytribromo-p-phenylene oxide, polymonobromo-p-phenylene oxide, and polydibromo-o-phenylene oxide.

Among these flame retardants, the polybrominated styrene and the brominated polystyrene are preferred, and the polybrominated styrene is more preferred, from the viewpoint of making the electrical characteristics of the polyamide resin composition in a high temperature region more favorable. Note that, the polybrominated styrene is likely to enhance the bending strength of a molded article, and the brominated polystyrene is more likely to enhance the flowability of the polyamide resin composition. Accordingly, the polybrominated styrene and the brominated polystyrene may be selectively used depending on desired properties for the polyamide resin composition and a molded article.

These flame retardants preferably have a content of bromine atoms of 50% by mass or more and 80% by mass or less, and more preferably 60% by mass or more and 80% by mass or less.

Further, these flame retardants preferably have a weight-average molecular weight (Mw) of 1,000 or more and 400,000 or less, more preferably 2,000 or more and 100,000 or less, and still more preferably 2,000 or more and 60,000 or less. The weight-average molecular weight is a weight-average molecular weight in terms of polystyrene measured using GPC (gel permeation chromatography) with chloroform as a mobile phase, at a column temperature of 40° C., and using a differential refractometer detector.

The content of these flame retardants is preferably 1% by mass or more and 40% by mass or less based on the total mass of the polyamide resin composition. When the content of the flame retardants is 1% by mass or more, the flowability of the polyamide resin composition and the electrical characteristics thereof in a high temperature region can be made more favorable. When the content of the flame retardants is 40% by mass or less, various properties, such as toughness, of the polyamide resin composition can be enhanced by increasing the amount of the polyamide resin in the resin composition. From the viewpoint described above, the content of the flame retardants is more preferably 5% by mass or more and 30% by mass or less, and still more preferably 12% by mass or more and 25% by mass or less, based on the total mass of the polyamide resin composition.

Further, the content of the flame retardants is 10 parts by mass or more and 70 parts by mass or less based on 100 parts by mass of the content of the polyamide resin contained in the polyamide resin composition. When the content of the flame retardants is 10 parts by mass or more, the flowability of the polyamide resin composition and the electrical characteristics thereof in a high temperature region can be made more favorable. When the content of the flame retardants is 70 parts by mass or less, various properties, such as toughness, of the polyamide resin composition can be enhanced by increasing the amount of the polyamide resin in the resin composition. From the viewpoint described above, the content of the flame retardants is preferably 20 parts by mass or more and 60 parts by mass or less, and more preferably 25 parts by mass or more and 55 parts by mass or less, based on 100 parts by mass of the content of the polyamide resin contained in the polyamide resin composition.

1-2-1-1. Flame Retardant Auxiliary Agent

In addition to the flame retardant (X), the polyamide resin composition preferably contains an antimony compound. The antimony compound acts as a flame retardant auxiliary agent which further enhances the action of a flame retardant.

Examples of the antimony compound include antimony trioxide, antimony tetroxide, antimony pentoxide, and sodium antimonate. Among these, sodium antimonate is preferred.

The content of the antimony compound is preferably 0.01% by mass or more and 5% by mass or less based on the total mass of the polyamide resin composition. When the content of the flame retardant auxiliary agent is 0.01% by mass or more, the effect of improving the flowability and the electrical characteristics in a high temperature region by the flame retardant is more favorably attained. When the content of the flame retardant auxiliary agent is 5% by mass or less, various properties, such as toughness, of the polyamide resin composition can be enhanced by increasing the amount of the polyamide resin in the resin composition. From the viewpoint described above, the content of the flame retardant auxiliary agent is more preferably 0.05% by mass or more and 3% by mass or less, still more preferably 0.1% by mass or more and 1% by mass or less, and particularly preferably 0.15% by mass or more and 0.4% by mass or less, based on the total mass of the polyamide resin composition.

The polyamide resin composition preferably further contains a salt of zinc or a salt of calcium in addition to the antimony compound. When the salt of zinc or the salt of calcium is used in combination with the antimony compound, the action of a flame retardant can be more efficiently enhanced.

Examples of the salt of zinc include zinc borate, zinc stannate, and zinc phosphate. Examples of the salt of calcium include calcium borate, and calcium molybdate. Among these, the salt of zinc is preferred, and zinc borate is more preferred. Note that, the zinc borate includes $2ZnO{\cdot}3B_2O_3$, $4ZnO{\cdot}B_2O_3{\cdot}H_2O$, and $2ZnO{\cdot}3B_2O_3{\cdot}3.5H_2O$, and the like. Among these, $2ZnO{\cdot}3B_2O_3$ and $4ZnO{\cdot}B_2O_3{\cdot}H_2O$ are preferred, and an anhydride of zinc borate ($2ZnO{\cdot}3B_2O_3$) is more preferred.

The content of the salt of zinc and the salt of calcium is preferably 0.5% by mass or more and 10% by mass or less based on the total mass of the polyamide resin composition. When the content of the salt of zinc and the salt of calcium is 0.5% by mass or more, the effect of improving the flowability and the electrical characteristics in a high temperature region by the flame retardant is more favorably attained. When the content of the salt of zinc and the salt of calcium is 10% by mass or less, various properties, such as toughness, of the polyamide resin composition can be enhanced by increasing the amount of the polyamide resin in the resin composition. From the viewpoint described above, the content of the salt of zinc and the salt of calcium is more preferably 1% by mass or more and 5% by mass or less, and still more preferably 1% by mass or more and 3% by mass or less, based on the total mass of the polyamide resin composition.

The ratio of the content (α) of the antimony compound to the content (β) of the salt of zinc and the salt of calcium is not particularly limited, and α/β can be selected from a range of 99/1 to 1/99. Note that, from the viewpoint of more suitably attaining the action by the salt of zinc or the salt of calcium, the content (β) of the salt of zinc or the salt of calcium is preferably larger than the content (a) of the antimony compound, and α/β is more preferably 30/70 to 1/99, and still more preferably 20/80 to 1/99.

1-2-2. Flame Retardant (Y)

The flame retardant (Y) is a phosphinate compound represented by formula (I), a bisphosphinate compound represented by formula (II), or a polymer of the phosphinate compound or the bisphosphinate compound.

(I)

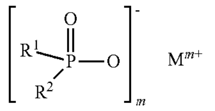

(II)

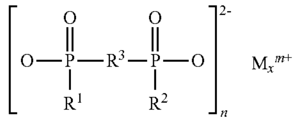

In formulae (I) and (II), $R^1$ and $R^2$ independently represent an alkyl group having 1 or more and 6 or less carbon atoms and being linear or having a branched chain or an aryl group, $R^3$ independently represents an alkylene group having 1 or more and 10 or less carbon atoms and being linear or having a branched chain, an arylene group having 6 or more and 10 or less carbon atoms, an alkylarylene group having 6 or more and 10 or less carbon atoms, or an arylalkylene group having 6 or more and 10 or less carbon atoms, M represents an atom or atomic group selected from the group consisting of Mg, Ca, Al, Sb, Sn, Ge, Ti, Zn, Fe, Zr, Ce, Bi, Sr, Mn, Li, Na, K, and a protonated nitrogenous base, m represents an integer of 1 to 4, n represents an integer of 1 to 4, and x represents an integer of 1 to 4.

Examples of the phosphinate compound represented by formula (I) and the bisphosphinate compound represented by formula (II) include calcium dimethylphosphinate, magnesium dimethylphosphinate, aluminum dimethylphosphinate, zinc dimethylphosphinate, calcium ethylmethylphosphinate, magnesium ethylmethylphosphinate, aluminum ethylmethylphosphinate, zinc ethylmethylphosphinate, calcium diethylphosphinate, magnesium diethylphosphinate, aluminum diethylphosphinate, zinc diethylphosphinate, calcium methyl-n-propyl phosphinate, magnesium methyl-n-propylphosphinate, aluminum methyl-n-propylphosphinate, zinc methyl-n-propylphosphinate, calcium methanedi(methylphophinate), magnesium methanedi(methylphophinate), aluminum methanedi(methylphophinate), zinc methanedi (methylphophinate), calcium benzene-1,4-(dimethylphosphinate), magnesium benzene-1,4-(dimethylphosphinate), aluminum benzene-1,4-(dimethylphosphinate), zinc benzene-1,4-(dimethylphosphinate), calcium methylphenylphosphinate, magnesium methylphenylphosphinate, aluminum methylphenylphosphinate, zinc methylphenylphosphinate, calcium diphenylphosphinate, magnesium diphenylphosphinate, aluminum diphenylphosphinate, and zinc diphenylphosphinate.

Among these, calcium dimethylphosphinate, aluminum dimethylphosphinate, zinc dimethylphosphinate, calcium ethylmethylphosphinate, aluminum ethylmethylphosphinate, zinc ethylmethylphosphinate, calcium diethylphosphinate, aluminum diethylphosphinate, and zinc diethylphosphinate are preferred, and aluminum diethylphosphinate is further preferred.

Examples of commercially available products of the phosphinate compound represented by formula (I) and the bisphosphinate compound represented by formula (II) include EXOLIT OP1230, OP1311, OP1312, OP930, and OP935 manufactured by Clariant ("EXOLIT" is a registered trademark of the same company).

Further, according to the findings of the present inventors, these flame retardants can make the electrical characteristics of the polyamide resin composition in a high temperature region more favorable. Although the reason for the above is not clear, it is considered that the above is caused by an improvement in the glass transition temperature and a decrease in the molecular motion property of the amorphous portion at a high temperature. Further, the flame retardant (Y) has a high capability of suppressing decomposition of a polyamide resin, and therefore can develop a higher flame retardancy even with the same content. Accordingly, when the flame retardant (Y) is used, an effect capable of suppressing a decrease in mechanical strength due to a reduced addition amount of a flame retardant is remarkable.

The content of these flame retardants is preferably 3% by mass or more and 20% by mass or less based on the total mass of the polyamide resin composition. When the content of the flame retardants is 3% by mass or more, the flowability of the polyamide resin composition and the electrical characteristics thereof in a high temperature region can be made more favorable. When the content of the flame retardants is 20% by mass or less, various properties, such as toughness, of the polyamide resin composition can be enhanced by increasing the amount of the polyamide resin in the resin composition, and it is easier to suppress a decrease in toughness due to the addition of a flame retardant. From the viewpoint described above, the content of the flame retardants is more preferably 5% by mass or more and 18% by mass or less, and still more preferably 10% by mass or more and 15% by mass or less, based on the total mass of the polyamide resin composition.

Further, the content of the flame retardants s 3 parts by mass or more and 50 parts by mass or less based on 100 parts by mass of the content of the polyamide resin contained in the polyamide resin composition. When the content of the flame retardants is 3 parts by mass or more, the flowability of the polyamide resin composition and the electrical characteristics thereof in a high temperature region can be made more favorable. When the content of the flame retardants is 50 parts by mass or less, various properties, such as toughness, of the polyamide resin composition can be enhanced by increasing the amount of the polyamide resin in the resin composition, and it is easier to suppress a decrease in toughness due to the addition of a flame retardant. From the viewpoint described above, the content of the flame retardants is preferably 5 parts by mass or more and 40 parts by mass or less, and more preferably 10 parts by mass or more and 35 parts by mass or less, based on 100 parts by mass of the content of the polyamide resin contained in the polyamide resin composition.

1-2-2-1. Flame Retardant Auxiliary Agent

In addition to the flame retardant, the polyamide resin composition may contain a flame retardant auxiliary agent that is publicly known. Examples of the flame retardant auxiliary agent include an antimony compound, a salt of zinc or a salt of calcium, calcium oxide, barium oxide, aluminum oxide, tin oxide, magnesium oxide, aluminum phosphate, boehmite, a phosphazene compound, and salts of one or more phosphorous compounds selected from phosphoric acid, pyrophosphoric acid and polyphosphoric acid and one or more compounds selected from melamine, melam and melem.

Examples of the antimony compound include antimony trioxide, antimony tetroxide, antimony pentoxide, and sodium antimonate. Among these, sodium antimonate is preferred.

The content of the antimony compound is preferably 0.01% by mass or more and 5% by mass or less based on the total mass of the polyamide resin composition. When the content of the flame retardant auxiliary agent is 0.01% by mass or more, the effect of improving the flowability and the electrical characteristics in a high temperature region by the flame retardant is more favorably attained. When the content of the flame retardant auxiliary agent is 5% by mass or less, various properties, such as toughness, of the polyamide resin composition can be enhanced by increasing the amount of the polyamide resin in the resin composition. From the viewpoint described above, the content of the flame retardant auxiliary agent is more preferably 0.05% by mass or more and 3% by mass or less, still more preferably 0.1% by mass or more and 1% by mass or less, and particularly preferably 0.15% by mass or more and 0.4% by mass or less, based on the total mass of the polyamide resin composition.

Examples of the salt of zinc include zinc borate, zinc stannate, and zinc phosphate. Examples of the salt of calcium include calcium borate, and calcium molybdate. Among these, the salt of zinc is preferred, and zinc borate is more preferred. Note that, the zinc borate includes $2ZnO \cdot 3B_2O_3$, $4ZnO \cdot B_2O_3 \cdot H_2O$, and $2ZnO \cdot 3B_2O_3 \cdot 3.5H_2O$, and the like. Among these, $2ZnO \cdot 3B_2O_3$ and $4ZnO \cdot B_2O_3 \cdot H_2O$ are preferred, and an anhydride of zinc borate ($2ZnO \cdot 3B_2O_3$) is more preferred.

The content of the salt of zinc and the salt of calcium is preferably 0.5% by mass or more and 10% by mass or less based on the total mass of the polyamide resin composition.

When the content of the salt of zinc and the salt of calcium is 0.5% by mass or more, the effect of improving the flowability and the electrical characteristics in a high temperature region by the flame retardant is more favorably attained. When the content of the salt of zinc and the salt of calcium is 10% by mass or less, various properties, such as toughness, of the polyamide resin composition can be enhanced by increasing the amount of the polyamide resin in the resin composition. From the viewpoint described above, the content of the salt of zinc and the salt of calcium is more preferably 1% by mass or more and 5% by mass or less, and still more preferably 1% by mass or more and 3% by mass or less, based on the total mass of the polyamide resin composition.

1-3. Other Component

The polyamide resin composition may contain any other publicly known component. The content of the other component is preferably 0% by mass or more and 20% by mass or less, more preferably 0% by mass or more and 10% by mass or less, and still more preferably 0.5% by mass or more and 10% by mass or less, based on the total mass of the polyamide resin composition.

Examples of the other component include a reinforcement, a crystal nucleating agent, a flowability improver, a corrosion resistance improver, a drip preventing agent, an ion scavenger, an elastomer (rubber), an antistatic agent, a mold release agent, an antioxidant (such as phenols, amines, sulfurs, and phosphorouses), a heat-resistance stabilizer (such as a lactone compound, vitamin E, hydroquinones, copper halide, and an iodine compound), a light stabilizer (such as benzotriazoles, triazines, benzophenones, benzoates, hindered amines, and oxanilides), and other polymers (polyolefines, an olefin copolymer such as an ethylene-propylene copolymer and an ethylene-1-butene copolymer, an olefin copolymer such as a propylene-1-butene copolymer, polystyrene, polyamide, polycarbonate, polyacetal, polysulfone, polyphenylene oxide, a fluororesin, a silicone resin, and LCP). Among these, the resin composition of the present disclosure preferably further contains a reinforcement from the viewpoint of increasing the mechanical strength of a molded article.

The reinforcement may impart a high mechanical strength to the resin composition. Examples of the reinforcement include: a fibrous reinforcement such as glass fiber, wollastonite, potassium titanate whisker, calcium carbonate whisker, aluminum borate whisker, magnesium sulfate whisker, zinc oxide whisker, milled fiber, and cut fiber; and a granular reinforcement. One of these reinforcements may be used alone or two or more thereof may be used in combination. Among these, wollastonite, glass fiber, and potassium titanate whisker are preferred and wollastonite or glass fiber is more preferred since the mechanical strength of a molded article is easily enhanced thereby. From the viewpoints of the moldability of the resin composition and the mechanical strength and the heat resistance of an obtained molded article, the average fiber length of the fibrous reinforcement may be, for example, 1 μm or more and 20 mm or less, and preferably 5 μm or more and 10 mm or less. Further, the aspect ratio of the fibrous reinforcement may be, for example, 5 or more and 2000 or less, and preferably 30 or more and 600 or less.

The average fiber length and the average fiber diameter of the fibrous reinforcement can be measured by the following methods.

1) The resin composition is dissolved in a hexafluoroisopropanol/chloroform solution (0.1/0.9% by volume) and then filtered, and a resulting filtrate is collected, and
2) The filtrate obtained in 1) is dispersed in water, and the fiber lengths (Li) and the fiber diameters (di) of arbitrary 300 fibers are measured using an optical microscope (magnification: 50 times), respectively. The number of fibers having a fiber length of Li is set to be qi, the weight-average length (Lw) is calculated based on the following equation, and the calculated value is defined as the average fiber length of the fibrous reinforcement.

$$\text{Weight-averaged length } (Lw)=(\Sigma qi\times Li^2)/(\Sigma qi\times Li)$$

In the same manner, the number of fibers having a fiber diameter of Di is set to be ri, the weight-average diameter (Dw) is calculated based on the following equation, and the calculated value is defined as the average fiber diameter of the fibrous reinforcement.

$$\text{Weight-averaged diameter } (Dw)=(\Sigma ri\times Di^2)/(\Sigma ri\times Di)$$

The content of the fibrous reinforcement is not particularly limited, but can be set to be, for example, 15% by mass or more and 70% by mass or less based on the total mass of the polyamide resin composition.

The crystal nucleating agent may enhance the crystallinity of a molded article. Examples of the crystal nucleating agent include: metal salt-based compounds including sodium 2,2-methylenebis(4,6-di-t-butylphenyl)phosphate, aluminum tris(p-t-butylbenzoate), a stearate, and the like; sorbitol-based compounds including bis(p-methylbenzylidene)sorbitol, bis(4-ethylbenzylidene)sorbitol, and the like; and inorganic matters including talc, calcium carbonate, hydrotalcite, and the like. Among these, talc is preferred from the viewpoint of further enhancing the crystallinity of a molded article. One of these crystal nucleating agents may be used alone or two or more thereof may be used in combination.

The content of the crystal nucleating agent is preferably 0.1 parts by mass or more and 5 parts by mass or less, and more preferably 0.1 parts by mass or more and 3 parts by mass or less, based on the total mass of the polyamide resin composition. When the content of the crystal nucleating agent is within the range described above, the crystallinity of a molded article is likely to be sufficiently enhanced, and a sufficient mechanical strength is likely to be obtained.

The corrosion resistance improver may be a metal oxide or a metal hydroxide. These compounds can suppress corrosive wear of a steel material (for example, a screw, a cylinder, a dice, a nozzle or the like used in a molding machine) due to the polyamide resin composition at a high temperature.

These metal oxides or metal hydroxides are preferably oxides or hydroxides of metals of Groups 1 to 12 in the Periodic Table of Elements, and more preferably oxides or hydroxides of metals of Groups 2 to 12 in the Periodic Table of Elements. In particular, the metal oxides are preferably oxides of element metals of Groups 4 to 12 in the Periodic Table of Elements, and more preferably oxides of element metals of Groups 7 to 12.

In particular, these metal oxides or metal hydroxides are preferably oxides or hydroxides of iron, magnesium, or zinc, and more preferably oxides or hydroxides of magnesium or zinc. Further, these metal oxides or metal hydroxides may be composite oxides of metals, such as zinc stannate and zinc hydroxystannate. Among these, magnesium hydroxide, magnesium oxide, and zinc oxide are preferred, and zinc oxide is more preferred. In particular, the corrosion inhibition and wear inhibition effects on a molding machine are remarkably attained by using zinc oxide in combination when the phosphinate compound represented by formula (I), the bisphosphinate compound represented by formula (II), or a polymer of the phosphinate compound or the bisphosphinate compound as the flame retardant (Y) is used.

These metal oxides or metal hydroxides preferably have a particle shape.

The content of the corrosion resistance improver is preferably 0.05% by mass or more and 2% by mass or less, more preferably 0.1% by mass or more and 1% by mass or less, and still more preferably 0.1% by mass or more and 0.5% by mass or less, based on the total mass of the polyamide resin composition.

The flowability improver enhances the flowability during injection molding of the polyamide resin composition and makes the appearance of a resulting molded article favorable. The flowability improver can be a fatty acid metal salt such as an oxycarboxylic acid metal salt and a higher fatty acid metal salt.

The oxycarboxylic acid constituting the oxycarboxylic acid metal salt may be an aliphatic oxycarboxylic acid or an aromatic oxycarboxylic acid. Examples of the aliphatic oxycarboxylic acid include aliphatic oxycarboxylic acids having 10 or more and 30 or less carbon atoms such as α-hydroxymyristic acid, α-hydroxypalmitic acid, α-hydroxystearic acid, α-hydroxyeicosanoic acid, α-hydroxydocosanoic acid, α-hydroxytetraeicosanoic acid, α-hydroxyhexaeicosanoic acid, α-hydroxyoctaeicosanoic acid, α-hydroxytriacontanoic acid, β-hydroxymyristic acid, 10-hydroxydecanoic acid, 15-hydroxypentadecanoic acid, 16-hydroxyhexadecanoic acid, 12-hydroxystearic acid, and ricinoleic acid. Examples of the aromatic oxycarboxylic acid include salicylic acid, m-oxybenzoic acid, p-oxybenzoic acid, gallic acid, mandelic acid, and tropic acid.

Examples of the metal constituting the oxycarboxylic acid metal salt include alkali metals such as lithium, and alkaline earth metals such as magnesium, calcium, and barium.

Among these, the oxycarboxylic acid metal salt is preferably a 12-hydroxystearic acid metal salt, and more preferably magnesium 12-hydroxystearate and calcium 12-hydroxystearate.

Examples of the higher fatty acid constituting the higher fatty acid metal salt include higher fatty acids having 15 or more and 30 or less carbon atoms such as stearic acid, oleic acid, behenic acid, behenic acid, and montanic acid.

Examples of the metal constituting the higher fatty acid metal salt include calcium, magnesium, barium, lithium, aluminum, zinc, sodium, and potassium.

Among these, the higher fatty acid metal salt is preferably calcium stearate, magnesium stearate, barium stearate, calcium behenate, sodium montanate, and calcium montanate. In particular, the effect of enhancing the flowability during injection molding of the polyamide resin composition and making the appearance of a resulting molded article favorable is remarkably attained by using barium stearate, preferably barium 12-hydroxystearate in combination when the phosphinate compound represented by formula (I), the bisphosphinate compound represented by formula (II), or a polymer of the phosphinate compound or the bisphosphinate compound as the flame retardant (Y) is used.

The content of the flowability improver is preferably 0.01% by mass or more and 1.3% by mass or less based on the total mass of the polyamide resin composition. When the content of the flowability improver is 0.01% by mass or more, the flowability at the time of molding is likely to be enhanced and the appearance characteristic of an obtained molded product is likely to be enhanced. When the content of the flowability improver is 1.3% by mass or less, gas due to decomposition of the flowability improver is unlikely to be generated at the time of molding and the appearance of a product is likely to be favorable.

The drip preventing agent suppresses dripping of a resin melted and liquefied by heat of combustion. Examples of the drip preventing agent include a fluororesin and modified polyolefins having a carboxy group, an acid anhydride group, an amino group, and the like in the molecule. Examples of the fluororesin include polytetrafluoroethylene (PTFE). Examples of the modified polyolefins include an aromatic vinyl compound/conjugated diene copolymer, such as polyethylene and SEBS, or a hydride thereof, and a modified product such as a polyolefin elastomer such as an ethylene-propylene copolymer. Among these, the modified polyolefin is preferred, and maleic acid-modified SEBS is more preferred.

The content of the drip preventing agent is preferably 0.1 parts by mass or more and 5 parts by mass or less, and more preferably 0.5 parts by mass or more and 5 parts by mass or less, based on the total mass of the polyamide resin composition. When the content of the drip preventing agent is within the range described above, dripping of a resin at the time of combustion can be sufficiently suppressed.

The ion scavenger captures hydrogen chloride (chloride ion) or the like in the polyamide resin composition to suppress deterioration of the polyamide resin composition.

Examples of the ion scavenger include hydrotalcite and zeolite. Note that, these ion scavengers are layered compounds, and have an action of enhancing the flame retardancy of the polyamide resin composition and a molded article, probably by an action such as dehydration of interlayer water.

The content of the ion scavenger is preferably 0.01 parts by mass or more and 3 parts by mass or less, and more preferably 0.1 parts by mass or more and 1 parts by mass or less, based on the total mass of the polyamide resin composition. When the content of the ion scavenger is within the range described above, the stability and the flame retardancy of the polyamide resin composition and a molded article are likely to be enhanced more sufficiently.

1-4. Manufacturing Method

The polyamide resin composition can be manufactured by a method in which the polyamide resin and other components when needed are mixed by a publicly known resin kneading method, for example, by using a Henschel mixer, a V-blender, a ribbon blender, or a tumbler blender, or can be manufactured by a method in which the mixing is followed by further melt-kneading using a single-screw extruder, a multi-screw extruder, a kneader or a banbury mixer, and then granulating or pulverizing.

2. Embodiment 2

Embodiment 2 of the present disclosure relates to a polyamide resin composition having the following properties.

Note that, it is possible to realize the polyamide resin composition having the following properties with the polyamide resin composition according to Embodiment 1. Having said that, the polyamide resin composition according to the present embodiment is not limited to the polyamide resin composition according to Embodiment 1, and the composition of the polyamide resin, the types and the blending amounts of various additives, and the like are not limited to those of the polyamide resin composition according to Embodiment 1 as long as the following properties can be realized.

The polyamide resin has a melting point (Tm), which is measured using a differential scanning calorimeter (DSC), of 280° C. or more and 330° C. or less and a glass transition temperature (Tg), which is measured using the DSC, of 135° C. or more and 180° C. or less.

When the melting point (Tm) of the polyamide resin is 280° C. or more, the mechanical strength, the heat resistance, and the like of the polyamide resin composition or a molded article in a high temperature region are unlikely to be impaired. When the melting point (Tm) of the polyamide resin is 330° C. or less, the molding processability of the polyamide resin composition is likely to be favorable since the molding temperature is not required to be excessively increased. From the viewpoint described above, the melting point (Tm) of the polyamide resin is more preferably 290° C. or more and 330° C. or less, and still more preferably 300° C. or more and 330° C. or less.

When the glass transition temperature (Tg) of the polyamide resin is 135° C. or more, the heat resistance of the polyamide resin composition or a molded article is unlikely to be impaired, and at the same time the mechanical strength and the electrical resistance in a high temperature region can be further enhanced. When the glass transition temperature (Tg) of the polyamide resin is 180° C. or less, the molding processability of the polyamide resin composition is likely to be favorable. From the viewpoint described above, the glass transition temperature (Tg) of the polyamide resin is more preferably 140° C. or more and 170° C. or less.

With respect to the polyamide resin composition, a flow length of the resin composition in a mold is 20 mm or more and 100 mm or less when a bar-flow mold having a width of 10 mm and a thickness of 0.5 mm is used and injection is performed with an injection pressure of 2000 kg/$cm^2$, a cylinder temperature of higher than the melting point of the polyamide resin by 10° C., and a mold temperature of 120° C. (hereinafter, which may also be simply referred to as "flow length").

When the flow length is 20 mm or more, the moldability of the polyamide resin composition can be further enhanced. When the flow length is 100 mm or less, generation of burrs to an end portion of a molded product due to overfilling can be suppressed and the appearance of the molded product can be made more favorable. From the viewpoint described above, the flow length is preferably 20 mm or more and 100 mm or less, more preferably 25 mm or more and 80 mm or less, and still more preferably 30 mm or more and 70 mm or less.

With respect to the polyamide resin composition, test piece A having a length of 64 mm, a width of 6 mm, and a thickness of 0.8 mm obtained by performing injection molding with an injection pressure of 2000 kg/$cm^2$, a cylinder temperature of higher than the melting point of the polyamide resin by 10° C., and a mold temperature of 120° C. satisfies following requirements I and II:

Requirement I: a temperature at which the test piece does not melt and no blister occurs on the surface of the test piece when the test piece is heated using a reflow soldering apparatus (hereinafter, which may also be simply referred to as "reflow heat resistance temperature") is 240° C. or more and 290° C. or less; and Requirement II: energy for breaking the test piece when a bending test is conducted at a bending speed of 5 mm/min under an atmosphere with a temperature of 23° C. and a relative humidity of 50% (hereinafter, which may also be simply referred to as "thin bending energy") is 30 mJ or more and 90 mJ or less.

When the reflow heat resistance temperature is 240° C. or more, a sufficient resistance to lead-free reflow soldering is obtained. When the reflow heat resistance temperature is 290° C. or less, the moldability of the polyamide resin composition is favorable since it is not necessary to excessively increase the melting point of the polyamide resin or to decrease the flowability of the polyamide resin composition. From the viewpoint described above, the reflow heat resistance temperature is preferably 240° C. or more and 280° C. or less, and more preferably 250° C. or more and 275° C. or less.

When the thin bending energy is 30 mJ or more, the strength of a molded article obtained from the polyamide resin composition is sufficiently high, and thus, the stress resistance of the molded article can be made sufficient even when the molded article is used in, for example, parts of an electronic device to which a vibration is imparted or parts of various apparatuses, such as an automobile, to which a stress is imparted. In particular, since the strength of a molded article sufficiently increases even when the molded article is thin, a sufficient stress resistance is obtained even when molding into a fine part is performed for the purpose of coping with a reduction in the size of an electronic device or the like.

When the thin bending energy is 90 mJ or less, the stress relaxation property of a molded article is sufficient, the molded article is unlikely to transmit an impact to other parts when the molded article receives the impact, and the molded article is unlikely to cause breakage of the other parts. From the viewpoint described above, the thin bending energy is preferably 30 mJ or more and 80 mJ or less, more preferably 33 mJ or more and 75 mJ or less, and more preferably 35 mJ or more 70 mJ or less.

With respect to the polyamide resin composition, a volume resistivity of square-plate test piece B at 130° C. is $10^{13}$Ω·cm or more and $10^{18}$ Ω·cm or less (hereinafter, which may also be simply referred to as "high-temperature resistivity"). Square-plate test piece B is a 100-mm square test piece with a thickness of 2 mm and is obtained by performing injection molding with an injection pressure of 100 Mpa, a cylinder temperature of higher than the melting point of the polyamide resin by 10° C., and a mold temperature of 120° C.

When the high-temperature resistivity is $10^{13}$ Ω·cm or more, the insulation property of a molded article can be further enhanced. In particular, even when molding into a fine part is performed for the purpose of coping with a reduction in the size of an electronic device or the like, a sufficient insulation property is obtained, and further an insulation property capable of sufficiently coping with an increased output of an electronic device is obtained. When the high-temperature resistivity is $10^{18}$ Ω·cm or less, static electricity is unlikely to accumulate in a molded article, and thus, it is possible to prevent dust from being adsorbed, and it is possible to suppress a decrease in long-term reliability of an electronic device due to dust being mixed into the electronic device. From the viewpoint described above, the high-temperature resistivity is preferably $10^{14}$ Ω·cm or more and $10^{18}$ Ω·cm or less, more preferably $10^{13}$ Ω·cm or more and $10^{17}$ Ω·cm or less, still more preferably $10^{13}$ Ω·cm or more and $10^{16}$ Ω·cm or less, and particularly preferably $10^{14}$ Ω·cm or more and $10^{16}$ Ω·cm or less.

3. Applications of Resin Composition

The resin composition of the present disclosure is used as various molded articles by being molded by a publicly known molding method such as a compression molding method, an injection molding method, and an extrusion molding method.

The molded article of the resin composition of the present disclosure can be used in various applications. Examples of such applications include: exterior automotive parts such as a radiator grille, a rear spoiler, a wheel cover, a wheel cap, a cowl vent grille, an air outlet louver, an air scoop, a hood bulge, a sunroof, a sunroof rail, a fender, and a backdoor; interior parts of an automotive engine compartment such as a cylinder head cover, an engine mount, an air intake manifold, a throttle body, an air intake pipe, a radiator tank, a radiator support, a water pump, a water pump inlet, a water pump outlet, a thermostat housing, a cooling fan, a fan shroud, an oil pan, an oil filter housing, an oil filler cap, an oil level gauge, an oil pump, a timing belt, a timing belt cover, and an engine cover; automotive fuel system parts such as a fuel cap, a fuel filler tube, an automotive fuel tank, a fuel sender module, a fuel cut-off valve, a quick connector, a canister, a fuel delivery pipe, and a fuel filler neck; automotive driving system parts such as a shift lever housing and a propeller shaft; automotive chassis parts such as a stabilizer bar linkage rod and an engine mount bracket;

automotive functional parts such as a window regulator, a door lock, a door handle, an outside door mirror stay, a wiper and parts thereof, an accelerator pedal, a pedal module, a joint, a resin screw, a nut, a bushing, a seal ring, a bearing, a bearing retainer, a gear, and an actuator; automotive electronics parts such as a wire harness connector, a relay block, a sensor housing, fuse parts, an encapsulation, an ignition coil, and a distributor cap; fuel system parts for general-purpose apparatuses such as a fuel tank for general-purpose apparatuses (a brushcutter, a lawn mower, and a chain saw); electrical and electronics parts such as a connector, a bus bar, and an LED reflector; building material parts; industrial device parts; and various enclosures or exterior parts such as small enclosures (including enclosures of personal computers, mobile phones, and the like) and exterior molded products. Among these, the resin composition of the present disclosure has a high mechanical strength and a high electrical resistance in a high temperature region and therefore can be suitably used for the application of an insulation material in various applications, and further can be suitably used for automotive electronic parts, electrical and electronics parts, industrial device parts, and parts of electrical devices, such as enclosures of electrical devices or exterior parts.

EXAMPLES

Hereinafter, a more detailed description will be given with reference to examples. The scope disclosed herein is not to be construed as limiting by the examples.

Note that, in the following experiments, the melting points (Tm) and the glass transition temperatures (Tg) of the polyamide resins were measured by the following methods.

(Melting Point (Tm) and Glass Transition Temperature (Tg))

The enthalpies of fusion (ΔH), the melting points (Tm), and the glass transition temperatures (Tg) of the polyamide resins were measured using a differential scanning calorimeter (DSC220C type, manufactured by Seiko Instruments Inc.).

Specifically, approximately 5 mg of a polyamide resin were hermetically sealed in an aluminum pan for measurement and heating to 350° C. at 10° C./min from room temperature was performed. To allow the resin to melt completely, the resin was held at 360° C. for 3 minutes, and then cooled to 30° C. at 10° C./min. After allowed to stand at 30° C. for 5 minutes, second heating was performed to 360° C. at 10° C./min. The temperature (° C.) of an endothermic peak in the second heating was defined as the melting point (Tm) of the crystalline polyamide resin, and the displacement point corresponding to the glass transition was defined as the glass transition temperature (Tg) thereof. The enthalpy of fusion (ΔH) was determined from the area of an exothermic peak of crystallization in the first temperature rising process in accordance with JIS K 7122.

(Intrinsic Viscosity [η])

0.5 g of the polyamide resin were dissolved in 50 ml of a 96.5% sulfuric acid solution, the flow-down time (sec) of the resulting solution under a condition of 25±0.05° C. was measured using an Ubbelohde viscometer, and the intrinsic viscosity [η] of the polyamide resin was calculated based on "equation: $[\eta]=\eta SP/(C(1+0.205\eta SP))$" where

[η]: intrinsic viscosity (dl/g),

ηSP: specific viscosity,

C: sample concentration (g/dl), t: flow-down time (sec) of sample solution, t0: flow-down time (sec) of blank sulfuric acid, and $\mu SP=(t-t0)/t0$.

(Enthalpy of Fusion (ΔH))

The enthalpy of fusion (ΔH) of the polyamide resin was determined from the area of an exothermic peak of crystallization in the first temperature rising process in accordance with JIS K 7122 (2012).

1. Synthesis/Preparation of Materials 1-1. Synthesis of Polyamide Resin (Synthesis Example 1)

An autoclave having an internal capacity of 1 L was charged with 259.5 g (1561.7 mmol) of terephthalic acid, 118.9 g (1023.1 mmol) of 1,6-diaminohexane, 85.0 g (551.1 mmol) of bis(aminomethyl)norbornane (manufactured by Mitsui Fine Chemicals, Inc.), 0.37 g of sodium hypophosphite monohydrate, and 81.8 g of distilled water, and nitrogen substitution was performed. Agitation was started at 190° C., and the internal temperature of the autoclave was raised to 250° C. over 3 hours. At this time, the internal pressure of the autoclave was increased to 3.0 MPa. The reaction was continued for 1 hour as it was, then the autoclave was vented to the atmosphere through a spray nozzle disposed in a lower portion of the autoclave, and a low-order condensate was extracted. Thereafter, this low-order condensate was cooled to room temperature, and then the low-order condensate was pulverized using a pulverizer to have a particle size of 1.5 mm or less, and was dried at 110° C. for 24 hours.

Subsequently, this low-order condensate was charged into a plate solid-phase polymerization apparatus. After nitrogen substitution, the temperature was raised to 215° C. over approximately 1 hour and 30 minutes. Thereafter, the reaction was continued for 1 hour and 30 minutes, and then the temperature was cooled to room temperature.

The resulting prepolymer was then melt-polymerized with a barrel setting temperature of 330° C., a screw rotation speed of 200 rpm, and a resin feed rate of 6 kg/h by using a twin-screw extruder having a screw diameter of 30 mm and an L/D of 36 to obtain polyamide resin 1.

Polyamide resin 1 thus obtained had an intrinsic viscosity [η] of 0.97 dl/g, a melting point (Tm) of 312° C., a glass transition temperature (Tg) of 167° C., and an enthalpy of fusion (ΔH) of 44 mJ/mg.

(Synthesis Example 2)

Polyamide resin 2 was obtained in the same manner as in Synthesis Example 1 except that the amount of terephthalic acid charged into the autoclave was 162.2 g (976.1 mmol), further 85.6 g (585.7 mmol) of adipic acid were charged, the amount of 1,6-diaminohexane was 182.9 g (1574.2 mmol), and bis(aminomethyl)norbornane (manufactured by Mitsui Fine Chemicals, Inc.) was not charged. Polyamide resin 2 had an intrinsic viscosity [η] of 0.8 dl/g, a melting point (Tm) of 320° C., a glass transition temperature (Tg) of 95° C., and an enthalpy of fusion (ΔH) of 48 mJ/mg.

1-2. Flame Retardant

The following flame retardants were used.

Flame retardant (X)

Polybrominated styrene (Great Lakes PBS-64HW: a homopolymer of dibromostyrene with the bromine content of 64% by mass manufactured by Chemtura Corporation)

Brominated polystyrene (SAYTEX HP-7010: brominated polystyrene with the bromine content of 68.5% by mass manufactured by Albemarle Corporation ("SAYTEX" is a registered trademark of the same company))

Flame retardant (Y)

Aluminum phosphinate (EXOLIT OP1230 manufactured by Clariant), an aluminum salt of diethylphosphinic acid, CAS-No. 225789-38-8

1-3. Flame Retardant Auxiliary Agent

An antimony compound (SA-A: sodium antimonate manufactured by Nihon Seiko Co., Ltd.)

A salt of boric acid (Firebrake 500: $2ZnO{\cdot}3B_2O_3$ manufactured by Borax Inc.) 1-4. Reinforcement Glass fiber (ECS03-615 manufactured by Central Glass Co., Ltd.)

1-5. Ion Scavenger

Hydrotalcite 1 (DHT-4C manufactured by Kyowa Chemical Industry Co., Ltd. ("DHT" is a registered trademark of the same company))

Hydrotalcite 2 (NAOX-33 manufactured by Toda Kogyo Corporation)

1-6. Crystal Nucleating Agent

Talc 1-7. Drip Preventing Agent

Maleated SEBS (Tuftec M1913 manufactured by Asahi Kasei Corporation ("Tuftec" is a registered trademark of the same company))

1-8. Corrosion Resistance Improver

Zinc oxide 1-9. Flowability Improver

Calcium montanate (LICOMONT CAV102 manufactured by Clariant ("LICOMONT" is a registered trademark of the same company))

Barium 12-hydroxystearate (BS-6 manufactured by Nitto Kasei Kogyo K.K.)

2. Preparation of Polyamide Resin Composition

The materials were mixed at a composition ratio (units are parts by mass) indicated in Table 1 using a tumbler blender, and were melt-kneaded under a cylinder temperature of condition of 300 to 335° C. using a 30 mmφ vented twin-screw extruder. Then the kneaded product was extruded into strands and cooled in a water tank. Thereafter, the strands were collected by a pelletizer and cut to thereby obtain a polyamide resin composition in the form of pellets.

3. Evaluation

The resulting polyamide resin compositions were evaluated with the following criteria.

3-1. Flow Length

Each polyamide resin composition was injected using a bar-flow mold having a width of 10 mm and a thickness of 0.5 mm under the following conditions, and the flow length (mm) of each polyamide resin composition in a mold was measured. Note that, it is indicated that the longer the flow length is, the more favorable the flowability during injection molding is.

Molding machine: EC75N-2A manufactured by Shibaura Machine Co., Ltd.

Injection setting pressure: 2000 $kg/cm^2$

Molding machine cylinder temperature: melting point of polyamide resin+10° C.

Mold temperature: 120° C.

3-2. Flame Retardancy

Each polyamide resin composition was injection-molded under the following conditions to prepare a 1/32 inch×1/2×5 inch test piece. The prepared test piece was used to conduct a vertical combustion test to evaluate the flame retardancy in accordance with the UL94 standard (UL Test No. UL94, Jun. 18, 1991).

Molding Machine: Tuparl TR40S3A manufactured by Sodick Plustech Co., Ltd.

Injection setting pressure: 2000 $kg/cm^2$

Molding machine cylinder temperature: melting point of polyamide resin+10° C.

Mold temperature: 120° C.

3-3. Reflow Heat Resistance Temperature

Each polyamide resin composition was injection-molded under the following conditions to prepare test piece A having a length of 64 mm, a width of 6 mm, and a thickness of 0.8 mm. Test piece A having been prepared was humidity-controlled at a temperature of 40° C. and a relative humidity of 95% for 96 hours.

Molding machine: EC75N-2A manufactured by Shibaura Machine Co., Ltd.

Injection setting pressure: 2000 $kg/cm^2$

Molding machine cylinder temperature: melting point of polyamide resin+10° C.

Mold temperature: 120° C.

Test piece A having been subjected to the humidity control treatment was placed on a glass epoxy substrate having a thickness of 1 mm on which a temperature sensor was installed. The glass epoxy substrate on which test piece A was placed was set in an air reflow soldering machine (AIS-20-82-C manufactured by Eightech Tectron CO., LTD), and a reflow step of a temperature profile illustrated in the FIGURE was performed. As illustrated in the FIGURE, the temperature was raised to 230° C. at a predetermined rate. Next, the temperature was raised to a predetermined set temperature (a: 270° C., b: 265° C., c: 260° C., d: 255° C., and e: 235° C.) in 20 seconds by heating, and then the temperature was decreased to 230° C. At this time, the maximum value of the set temperature at which test piece A did not melt and no blister was generated on the surface of test piece A was determined, and this maximum value of the set temperature was defined as the reflow heat resistance temperature.

3-4. Thin Bending Energy

Each resulting polyamide resin composition was injection-molded under the following conditions to prepare test piece A having a length of 64 mm, a width of 6 mm, and a thickness of 0.8 mm.

Molding machine: EC75N-2A manufactured by Shibaura Machine Co., Ltd.

Injection setting pressure: 2000 $kg/cm^2$

Molding machine cylinder temperature: melting point of polyamide resin+10° C.

Mold temperature: 120° C.

Test piece A having been prepared was allowed to stand under a nitrogen atmosphere at a temperature of 23° C. for 24 hours. Then, under an atmosphere with a temperature of 23° C. and a relative humidity of 50%, a bending test was conducted using a bending tester: ABS manufactured by NTESCO CO., Ltd. with a span of 26 mm and a bending speed of 5 mm/min. Energy (toughness) required for breaking test piece A was determined from the bending strength, the strain amount, and the elastic modulus.

3-5. High-Temperature Resistivity

Square-plate test piece B as a 100-mm square test piece having a thickness of 2 mm, which was prepared with the following molding conditions, was molded using the following injection molding machine.

Molding machine: EC75N-2A manufactured by Shibaura Machine Co., Ltd.

Injection setting pressure: 2000 $kg/cm^2$

Molding machine cylinder temperature: melting point of polyamide resin+10° C.

Mold temperature: 120° C.

This test piece B having a square plate shape was allowed to stand under an atmosphere with a temperature of 23° C.

and a relative humidity of 50% for 24 hours. Thereafter, in accordance with ASTM D257: 2007, the volume resistivity of test piece B when the temperature in a chamber was 130° C. was measured using model 8340A manufactured by ADC Corporation and was defined as high-temperature resistivity X1. For each resin composition, a resin composition having the same composition except for containing no flame retardant and flame retardant auxiliary agent was prepared, and the volume resistivity of test piece B was measured in the same manner and was defined as high-temperature resistivity X2.

Further, in order to confirm to what extent the volume resistivity at the time of a high temperature changed due to the addition of the flame retardant and the flame retardant auxiliary agent, the ratio of high-temperature resistivity X1 to high-temperature resistivity X2 (X1/X2) and the difference between high-temperature resistivity X1 and high-temperature resistivity X2 (Δ(X2-X1) or Δ(X1-X2)) were calculated.

3-6. High-Temperature Tensile Strength

Each resulting polyamide resin composition was injection-molded under the following conditions to obtain (A) STM dumbbell test piece Type I having a thickness of 3.2 mm.

Molding Machine: SG50M3 manufactured by Sumitomo Heavy Industries, Ltd.

Injection setting pressure: 2000 $kg/cm^2$

Molding machine cylinder temperature: melting point of polyamide resin+10° C.

Mold temperature: 120° C.

Injection setting speed: 60 mm/sec

The resulting test piece was allowed to stand under a nitrogen atmosphere at a temperature of 23° C. for 24 hours. Then, with the conditions other than the temperature being in accordance with ASTMD 638, a tensile test was conducted under an atmosphere with a temperature of 130° C. and a relative humidity of 50%, and the resulting tensile strength was defined as high-temperature tensile strength Y1. For each resin composition, a resin composition having the same composition except for containing no flame retardant and flame retardant auxiliary agent was prepared, and the tensile strength of the dumbbell test piece was measured in the same manner and was defined as high-temperature tensile strength Y2.

Further, in order to confirm to what extent the tensile strength at the time of a high temperature changed due to the addition of the flame retardant and the flame retardant auxiliary agent, the ratio of high-temperature tensile strength Y1 to high-temperature tensile strength Y2 (Y1/Y2) was calculated.

Tables 1 to 4 indicate compositions, flow lengths, flame retardancies, reflow heat resistance temperatures, thin bending energies, high-temperature resistivities, and high-temperature tensile strengths of the prepared polyamide resin compositions.

TABLE 1

| | | | Ex. 1 | Ex. 2 | Ex. 3 |
|---|---|---|---|---|---|
| Formulation | Polyamide resin | Polyamide resin 1 (6T/NBDAT = 65/35) | 44.3 | 43.0 | 45.35 |
| | | Polyamide resin 2 (6T/66 = 62.5/37.5) | | | |
| | Flame retardant | Polybrominated styrene | 20 | | |
| | | Brominated polystyrene | | 21.4 | 18 |
| | Flame retardant auxiliary agent | Antimony compound | 0.37 | 0.37 | 2 |
| | | Salt of boric acid | 2.63 | 2.63 | |
| | Reinforcement | Glass fiber | 30 | 30 | 30 |
| | Ion scavenger | Hydrotalcite 1 | 0.3 | | |
| | | Hydrotalcite 2 | | 0.2 | 0.2 |
| | Nucleating agent | Talc | 0.7 | 0.7 | 0.7 |
| | Drip preventing agent | Maleated SEBS | 1.4 | 1.4 | 3.5 |
| | Flowability improver | Calcium montanate | 0.3 | 0.3 | 0.25 |
| Physical properties | Flowability | L/t (mm) | 65 | 83 | 77 |
| | Flame retardancy | UL-94 V test | V-0 | V-0 | V-0 |
| | Reflow heat resistance temperature | (° C.) | 255 | 255 | 255 |
| | Thin bending energy | (mJ) | 45 | 35 | 40 |
| | High-temperature resistivity X1 | (Ω · cm) | $4 \times 10^{14}$ | $4 \times 10^{14}$ | $4 \times 10^{14}$ |
| | Change in high-temperature resistivity | X1/X2 | 0.8 | 0.8 | 0.8 |
| | | Δ(X2 − X1) | $1 \times 10^{14}$ | $1 \times 10^{14}$ | $1 \times 10^{14}$ |
| | High-temperature tensile strength Y1 | (MPa) | 146 | 146 | 142 |
| | Change in high-temperature tensile strength | Y1/Y2 | 0.91 | 0.91 | 0.89 |

TABLE 2

| | | | Comp. Ex. 1 | Comp. Ex. 2 | Comp. Ex. 3 | Comp. Ex. 4 | Comp. Ex. 5 |
|---|---|---|---|---|---|---|---|
| Formulation | Polyamide resin | Polyamide resin 1 (6T/NBDAT = 65/35) | | | | 69.3 | |
| | | Polyamide resin 2 (6T/66 = 62.5/37.5) | 44.3 | 43.0 | 45.35 | | 69.3 |
| | Flame retardant | Polybrominated styrene | 20 | | | | |
| | | Brominated polystyrene | | 21.4 | 18 | | |
| | Flame retardant auxiliary agent | Antimony compound | 0.37 | 0.37 | 2 | | |
| | | Salt of boric acid | 2.63 | 2.63 | | | |

TABLE 2-continued

| | | | Comp. Ex. 1 | Comp. Ex. 2 | Comp. Ex. 3 | Comp. Ex. 4 | Comp. Ex. 5 |
|---|---|---|---|---|---|---|---|
| | Reinforcement | Glass fiber | 30 | 30 | 30 | 30 | 30 |
| | Ion scavenger | Hydrotalcite 1 | 0.3 | | | | |
| | | Hydrotalcite 2 | | 0.2 | 0.2 | | |
| | Nucleating agent | Talc | 0.7 | 0.7 | 0.7 | 0.7 | 0.7 |
| | Drip preventing agent | Maleated SEBS | 1.4 | 1.4 | 3.5 | | |
| | Flowability improver | Calcium montanate | 0.3 | 0.3 | 0.25 | | |
| Physical properties | Flowability | L/t (mm) | 70 | 85 | 80 | | |
| | Flame retardancy | UL-94 V test | V-0 | V-0 | V-0 | | |
| | Reflow heat resistance temperature | (° C.) | 260 | 260 | 260 | | |
| | Thin bending energy | (mJ) | 65 | 50 | 55 | | |
| | High-temperature resistivity X1 | | $4 \times 10^{10}$ | $6 \times 10^{10}$ | $6 \times 10^{10}$ | $5 \times 10^{14}$ | $2 \times 10^{11}$ |
| | Change in high-temperature resistivity | X1/X2 | 0.2 | 0.3 | 0.3 | | |
| | | Δ(X2 − X1) | $1.6 \times 10^{10}$ | $1.6 \times 10^{10}$ | $1.4 \times 10^{10}$ | | |
| | High-temperature tensile strength Y1 | (MPa) | 108 | 110 | 103 | 160 | 131 |
| | Change in high-temperature tensile strength | Y1/Y2 | 0.82 | 0.84 | 0.79 | | |

TABLE 3

| | | | Ex. 4 | Ex. 5 | Ex. 6 |
|---|---|---|---|---|---|
| Formulation | Polyamide resin | Polyamide resin 1 (6T/NBDAT = 65/35) | 53.65 | 49.65 | 53.65 |
| | | Polyamide resin 2 (6T/66 = 62.5/37.5) | | | |
| | Flame retardant | Aluminum phosphinate | 13 | 17 | 13 |
| | Flame retardant auxiliary agent | Salt of boric acid | 2 | 2 | 2 |
| | Reinforcement | Glass fiber | 30 | 30 | 30 |
| | Crystal nucleating agent | Talc | 0.7 | 0.7 | 0.7 |
| | Corrosion resistance improver | Zinc oxide | 0.4 | 0.4 | 0.4 |
| | Flowability improver | Calcium montanate | 0.25 | 0.25 | |
| | | Barium 12-hydroxystearate | | | 0.25 |
| Physical properties | Flowability | L/t (mm) | 40 | 30 | 43 |
| | Flame retardancy | UL-94 V test | V-0 | V-0 | V-0 |
| | Reflow heat resistance temperature | (° C.) | 250 | 250 | 250 |
| | Thin bending energy | (mJ) | 50 | 39 | 51 |
| | High-temperature resistivity X1 | | $8 \times 10^{15}$ | $8 \times 10^{15}$ | $8 \times 10^{15}$ |
| | Change in high-temperature resistivity | Δ(X1 − X2) | $7.7 \times 10^{15}$ | $7.7 \times 10^{15}$ | $7.7 \times 10^{15}$ |
| | High-temperature tensile strength Y1 | (MPa) | 120 | 112 | 122 |
| | Decrease in high-temperature tensile strength | Y1/Y2 | 0.77 | 0.72 | 0.79 |

TABLE 4

| | | | Comp. Ex. 6 | Comp. Ex. 7 | Comp. Ex. 8 | Comp. Ex. 9 | Comp. Ex. 10 |
|---|---|---|---|---|---|---|---|
| Formulation | Polyamide resin | Polyamide resin 1 (6T/NBDAT = 65/35) | | | | 69.05 | |
| | | Polyamide resin 2 (6T/66 = 62.5/37.5) | 53.65 | 49.65 | 53.65 | | 69.05 |
| | Flame retardant | Aluminum phosphinate | 13 | 17 | 13 | | |
| | Flame retardant auxiliary agent | Salt of boric acid | 2 | 2 | 2 | | |
| | Reinforcement | Glass fiber | 30 | 30 | 30 | 30 | 30 |
| | Crystal nucleating agent | Talc | 0.7 | 0.7 | 0.7 | 0.7 | 0.7 |
| | Corrosion resistance improver | Zinc oxide | 0.4 | 0.4 | 0.4 | | |
| | Flowability improver | Calcium montanate | 0.25 | 0.25 | | 0.25 | |
| | | Barium 12-hydroxystearate | | | 0.25 | | 0.25 |
| Physical properties | Flowability | L/t (mm) | 62 | 50 | 63 | — | — |
| | Flame retardancy | UL-94 V test | V-0 | V-0 | V-0 | — | — |
| | Reflow heat resistance temperature | (° C.) | 260 | 260 | 260 | — | — |
| | Thin bending energy | (mJ) | 57 | 50 | 56 | — | — |
| | High-temperature resistivity X1 | (Ω · cm) | $3 \times 10^{13}$ | $3 \times 10^{13}$ | $3 \times 10^{13}$ | $3 \times 10^{14}$ | $1 \times 10^{10}$ |
| | Change in high-temperature resistivity | Δ(X1 − X2) | $2.99 \times 10^{13}$ | $2.99 \times 10^{13}$ | $2.99 \times 10^{13}$ | — | — |
| | High-temperature tensile strength Y1 | (MPa) | 74 | 64 | 74 | 155 | 123 |
| | Decrease in high-temperature tensile strength | Y1/Y2 | 0.6 | 0.52 | 0.6 | | |

As is apparent from Tables 1 to 4, when the flame retardant (X) or the flame retardant (Y) is used in combination for a polyamide resin containing the component unit (b2) derived from a diamine represented by formula (1) as the component unit (b) derived from a diamine, a decrease in electrical resistance in a high temperature region can be suppressed or electrical resistance in a high temperature region can be further enhanced.

Further, when the flame retardant (X) or the flame retardant (Y) is used in combination for a polyamide resin containing the component unit (b2) derived from a diamine represented by formula (1) as the component unit (b) derived from a diamine, a decrease in high-temperature tensile strength can be suppressed.

This application claims priority based on Japanese Application No. 2021-057551, filed on Mar. 30, 2021, and Japanese Application No. 2021-057558, filed on Mar. 30, 2021, the contents of which including the claims and specifications are incorporated herein by reference.

INDUSTRIAL APPLICABILITY

The polyamide resin composition of the present disclosure has a high electrical resistance in a high temperature region. Accordingly, the present disclosure is expected to expand the applicability of polyamide resins to parts of electrical devices that are expected to have high power and parts of electrical devices whose sizes are required to be reduced, and to contribute to further popularization of polyamide resins.

The invention claimed is:

1. A polyamide resin composition, comprising:

a polyamide resin, wherein the polyamide resin has the content of 20% by mass or more to 80% by mass or less, based on a total mass of the polyamide resin composition, wherein the polyamide resin has, as measured using a differential scanning calorimeter (DSC), a melting point (Tm) of 280° C. or more and 335° C. or less and a glass transition temperature (Tg) of 135° C. or more and 180° C. or less, wherein the polyamide resin contains:

a component unit (a) derived from a dicarboxylic acid; and a component unit (b) derived from a diamine, wherein the component unit (a) derived from the dicarboxylic acid includes a component unit derived from an aromatic dicarboxylic acid or an alicyclic dicarboxylic acid, and the component unit (b) derived from the diamine includes:

a component unit (b1) derived from an alkylenediamine having 4 or more and 18 or less carbon atoms, the component unit (b1) having the content of more than 50 mol % and 90 mol % or less, based on a total number of moles of the component unit (b) derived from the diamine; and a component unit (b2) derived from a diamine represented by following formula (1), the component unit (b2) having the content of 10 mol % or more and less than 50 mol %, based on the total number of moles of the component unit (b) derived from the diamine Formula (1)

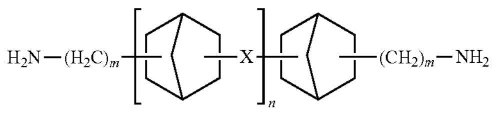

where n and two m's each independently represent 0 or 1, and

—X— represents a single bond or a divalent group selected from the group consisting of —O—, —S—, —$SO_2$—, —CO—, and —$CH_2$—; and a flame retardant, wherein the flame retardant is a flame retardant (X) selected from the group consisting of polybrominated styrene, brominated polystyrene, and brominated polyphenylene, the flame retardant (X) having the content of 1% by mass or more and 40% by mass or less, based on the total mass of the polyamide resin composition, or a flame retardant (Y) containing a phosphinate compound represented by formula (I), a bisphosphinate compound represented by formula (II), or a polymer of the phosphinate compound or the bisphosphinate compound, the flame retardant (Y) having the content of 3% by mass or more and 20% by mass or less, based on the total mass of the polyamide resin composition (I)

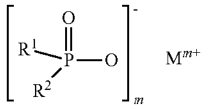

(II)

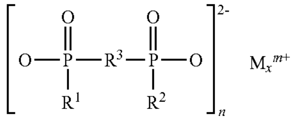

where $R^1$ and $R^2$ independently represent an alkyl group having 1 or more and 6 or less carbon atoms and being linear or having a branched chain or an aryl group, $R^3$ independently represents an alkylene group having 1 or more and 10 or less carbon atoms and being linear or having a branched chain, an arylene group having 6 or more and 10 or less carbon atoms, an alkylarylene group having 6 or more and 10 or less carbon atoms, or an arylalkylene group having 6 or more and 10 or less carbon atoms, M represents an atom or atomic group selected from the group consisting of Mg, Ca, Al, Sb, Sn, Ge, Ti, Zn, Fe, Zr, Ce, Bi, Sr, Mn, Li, Na, K, and a protonated nitrogenous base, m represents an integer of 1 to 4, n represents an integer of 1 to 4, and x represents an integer of 1 to 4.

2. The polyamide resin composition according to claim 1, wherein the component unit (b2) derived from the diamine represented by formula (1) has the content of 15 mol % or more and less than 45 mol %, based on the total number of moles of the component unit (b) derived from the diamine.

3. The polyamide resin composition according to claim 1, wherein the component unit (b1) derived from the alkylenediamine having 4 or more and 18 or less carbon atoms includes a component unit derived from a linear alkylenediamine or a branched alkylenediamine.

4. The polyamide resin composition according to claim 3, wherein the linear alkylenediamine or the branched alkylenediamine is a diamine selected from the group consisting of 1,4-diaminobutane, 1,6-diaminohexane, 1,9-nonanediamine, 1,10-decanediamine, 2-methyl-1,5-pentanediamine, and 2-methyl-1,8-octanediamine.

5. The polyamide resin composition according to claim 1, wherein the aromatic dicarboxylic acid or the alicyclic dicarboxylic acid is terephthalic acid, naphthalenedicarboxylic acid or cyclohexanedicarboxylic acid.

6. The polyamide resin composition according to claim 1, wherein the flame retardant is the flame retardant (Y) containing the phosphinate compound represented by formula (I), the bisphosphinate compound represented by formula (II), or the polymer of the phosphinate compound or the bisphosphinate compound.

7. The polyamide resin composition according to claim 1, wherein the flame retardant is the flame retardant (X) selected from the group consisting of polybrominated styrene, brominated polystyrene, and brominated polyphenylene.

8. The polyamide resin composition according to claim 7, further comprising an antimony compound, the antimony compound having the content of 0.01% by mass or more and 5% by mass or less based on the total mass of the polyamide resin composition.

9. The polyamide resin composition according to claim 8, further comprising a salt of zinc or a salt of calcium, the salt(s) having the content of 0.5% by mass or more and 10% by mass or less based on the total mass of the polyamide resin composition.

10. The polyamide resin composition according to claim 1, wherein the polyamide resin composition is a resin composition for an insulation material.

11. A polyamide molded article, comprising the polyamide resin composition according to claim 1.

12. The polyamide molded article according to claim 11, wherein the polyamide molded article is parts of an electrical device.

* * * * *